United States Patent
Kronholm et al.

(10) Patent No.: US 7,435,403 B2
(45) Date of Patent: Oct. 14, 2008

(54) SEPARATION AND PURIFICATION OF FULLERENES

(75) Inventors: David F. Kronholm, Boston, MA (US); Jack B. Howard, Winchester, MA (US)

(73) Assignee: Nano-C LLC, Westwood, MA (US)

(*) Notice: Subject to any disclaimer, the term of this patent is extended or adjusted under 35 U.S.C. 154(b) by 552 days.

(21) Appl. No.: 10/614,404

(22) Filed: Jul. 3, 2003

(65) Prior Publication Data

US 2004/0057896 A1  Mar. 25, 2004

Related U.S. Application Data

(60) Provisional application No. 60/393,494, filed on Jul. 3, 2002.

(51) Int. Cl.
*B01J 19/08* (2006.01)

(52) U.S. Cl. .................... 423/445 B; 977/843; 977/845

(58) Field of Classification Search ............... 423/460, 423/461, 445 B; 977/842, 845, 900, 734
See application file for complete search history.

(56) References Cited

U.S. PATENT DOCUMENTS

| | | | |
|---|---|---|---|
| 4,089,637 A | 5/1978 | Smith et al. | |
| 5,076,779 A | 12/1991 | Kobayashi | |
| 5,199,357 A | 4/1993 | Garcia-Mallol | |
| 5,211,932 A | 5/1993 | Blaylock et al. | |
| 5,227,038 A | 7/1993 | Smalley | |
| 5,273,729 A * | 12/1993 | Howard et al. | 423/445 B |
| 5,295,816 A | 3/1994 | Kobayashi et al. | |
| 5,300,203 A | 4/1994 | Smalley | |
| 5,304,366 A * | 4/1994 | Lorents et al. | 423/445 B |
| 5,458,742 A | 10/1995 | Mueller et al. | |
| 5,662,876 A | 9/1997 | Tour et al. | |
| 5,985,232 A * | 11/1999 | Howard et al. | 423/447.3 |
| 6,083,469 A | 7/2000 | Leftin | |
| 6,162,411 A * | 12/2000 | Howard et al. | 423/445 B |
| 6,887,291 B2 | 5/2005 | Alford et al. | |
| 2003/0044342 A1 | 3/2003 | Alford et al. | |
| 2003/0143151 A1 | 7/2003 | Diener et al. | |
| 2005/0129607 A1 | 6/2005 | Hiroaki et al. | |
| 2005/0129608 A1 | 6/2005 | Takehara et al. | |
| 2006/0140845 A1 | 6/2006 | Takehara | |

FOREIGN PATENT DOCUMENTS

JP  2003-160316  6/2003

(Continued)

OTHER PUBLICATIONS

Greico, et al., "Fullerenic Carbon in Combustion-Generated Soot," Carbon 38 pp. 597-614 (2000).*

(Continued)

*Primary Examiner*—Stuart L. Hendrickson
*Assistant Examiner*—Daniel C. McCracken
(74) *Attorney, Agent, or Firm*—Wilmer, Cutler, Pickering, Hale and Dorr, LLP

(57) ABSTRACT

A method of processing fullerenes includes generating a gas stream having suspended soot particles and condensable gases, wherein the condensable gases comprise fullerenes, and separating at least a portion of the condensable gases from the suspended soot particles using a gas/solid separations process. At least a portion of the fullerenes in the condensable gases can be condensed and collected after separation of the condensable gases.

87 Claims, 10 Drawing Sheets

FOREIGN PATENT DOCUMENTS

| | | |
|---|---|---|
| JP | 2003-160317 | 6/2003 |
| JP | 2003-160318 | 6/2003 |
| JP | 2003-192318 | 7/2003 |
| JP | 2003-192319 | 7/2003 |
| JP | 2003-192320 | 7/2003 |
| JP | 2003-192321 | 7/2003 |
| JP | 2003-221216 | 8/2003 |
| JP | 2003-238132 | 8/2003 |
| JP | 2004-269298 | 9/2004 |
| WO | WO 03/021018 | 3/2003 |

OTHER PUBLICATIONS

Brown, LeMay & Bursten, Chemistry: the Central Science, p. G-16 (7th ed., Prentice-Hall 1997).*

McCabe, Smith & Harriot, Unit Operations of Chemical Engineering, 1060-1062 (5th ed., McGraw-Hill 1993).*

Bogdanov, et al., Development Prospects of the Commercial Production of Fullerenes, Technical Physics 2000; 45(5): 521-527.*

Baum, et al. "Fullerene Ions and Their Relation to PAH and Soot in Low-pressure Hydrocarbon Flames", Ber. Bunsenges. Phys. Chem. 96, No. 7, pp. 841-857. (1992).

Dagaut, et al., "A Jet-Stirred Reactor for Kinetic Studies of Homogeneous Gas-Phse Reactions at Pressures up to Ten Atmospheres", J. of Physics E: Scientific Instruments, vol. 19, pp. 207-209 (1986).

Dresselhaus, et al. Science of Fullerenes and Carbon Nanotubes, Academic Press, San Diego, CA. (1996).

Gerhardt et al. "Polyhedral Carbon Ions in Hydrocarbon Flames", Chemical Physics Letters, vol. 137, No. 4, pp. 306-310 (1987).

Goel et al. "Combustion Synthesis of Fullerenes and Fullerenic Nanostructures", Carbon 40, pp. 177-182 (2002).

Goel et al. "Reaction Rate Coefficient of Fullerene (C60) Consumption by Soot", Carbon 0 (2003).

Grieco, et al. "Fullerenic Carbon in Combustion-Generated Soot", Carbon 38 pp. 597-614 (2000).

Howard et al., "Production of $C_{60}$ and $C_{70}$ Fullerenes in Benzene-Oxygen Flames," The Journal of Physical Chemistry, 96(26):6657-6662 (1992).

Howard et al., "Fullerenes $C_{60}$ and $C_{70}$ in flames," Nature, 352:139-141 (1991).

Kronholm, D, "Molecular Weight Growth Pathways in Fuel-Rich combustion", Massachusetts Institute of Technology (2000).

Kroto et al., "$C_{60}$ Buckinminsterfullerene," Nature, 318: 162-163 (1985).

Krusic et al. "Radical Reactions of C60, Science", Nov. 22,. vol. 254 (1991).

Lam, et al. "The Behavior of Polycyclic Aromatic Hydrocarbons During the Early Stages of Soot Formation" Twenty-Second Symposium on Combustion, pp. 323-332 (1988).

Longwell et al., "High Temperature Reaction Rates in Hydrocarbon Combustion," Industrial and Engineering Chemistry, 47(8):1634-1643 (1955).

Macadam, S. "Soot Surface Growth Mechanisms in Stationary Combustion Systems", Massachusetts Institute of Technology (1997).

McKinnon et al., "Combustion Synthesis of Fullerenes," Combustion and Flame, 88:102-112 (1992).

Nenniger et al., "Characterization of a Toroidal Well Stirred Reactor," Twentieth Symposium (International) on Combustion/ The Combustion Institute, pp. 473-479 (1984).

Reilly, et al. "Fullerene Evolution in Flame-Generated Soot", J. Am. Chem. Soc., vol. 122, No. 47, pp. 11596-11601 (2000).

Richter et al., "Formation of Polycyclic Aromatic Hydrocarbons and Their Growth to Soot—a Review of Chemical Reaction Pathways", Progress in Energy and Combustion Science, 26, pp. 565-608 (2000).

Richter et al. "Formation Mechanism of Polycyclic Aromatic Hydrocarbons and Fullerenes in Premixed Benzene Flames", Combustion and Flame, 119:1-22 (1999).

Richter et al., "Fabrication of fullerenes in benzene/oxygene/argon- and benzene/acetylene/oxygen/argon flames," J. Chim Phys., 92: 1272-1286 (1995).

International Search Report for International Patent Application No. PCT/US03/21301, filed Jul. 3, 2003.

Homann, "Fullerenes and Soot Formation—New Pathways to Large Particles in Flames", Angew. Chem. Int. Ed. 37, pp. 2434-2451. (1998).

* cited by examiner

Graph taken from Richter et al., Combustion and Flame, 119, 1-22, 1999.

SEPARATION AND PURIFICATION OF FULLERENES

RELATED APPLICATIONS

This application claims the benefit of priority under 35 U.S.C. § 119(e) from U.S. Patent Application Ser. No. 60/393,494, which is incorporated herein by reference.

FIELD OF THE INVENTION

This application relates to the separation and purification of fullerenes. In particular, it relates to solvent-free methods for the separation and purification of fullerenes in a process that is coupled to fullerene formation processes.

BACKGROUND OF THE INVENTION

Fullerenes are closed-cage carbon molecules composed of carbon-containing pentagons and hexagons. The discovery of Buckminsterfullerene, a $C_{60}$ spherical allotrope of carbon, in 1985 by Kroto, et al. ("$C_{60}$ Buckminsterfullerene"; *Nature* 318:162 (November 1985)) precipitated a flurry of activity directed towards understanding the nature and properties of fullerenes, particularly their use in synthetic chemistry and as electron acceptors, radical scavengers, non-linear optical limiters, and in many other applications. This research and development has been significantly hampered by the difficulty in obtaining large quantities of pure materials.

To date, fullerenes have been synthesized using a laser to ablate graphite, burning graphite in a furnace or by producing an arc across two graphite electrodes in an inert atmosphere. Other methods applied to synthesize fullerenes include negative ion/desorption chemical ionization and combustion of a fullerene-forming fuel. At present, combustion is the only method used for high volume production. In each method, condensable matter comprising a mixture of soot, other insoluble condensed matter, $C_{60}$, $C_{70}$, and higher as well as lower numbered fullerenes, and polycyclic aromatic hydrocarbons (PAH) in varying amounts is collected, with the total fullerene fraction typically between 5 and 15% of the total material collected, with the soot being 80%-95% of the remaining total material.

The procedures most commonly used for purifying fullerenes employ significant amounts of organic solvents. The solvents are used to first extract a fullerene mixture from insoluble soot and other insoluble condensed materials and then are used to purify and separate the individual fullerenes. Typically, the different constituents of the condensed matter are collected by filtration or some other technique, and the soluble components are extracted by a high energy-input extraction process such as sonication or soxhlet extraction using an organic solvent such as toluene. The extraction solution is then typically filtered to eliminate the particulate matter, and then purified by high performance liquid chromatography (HPLC), which separates the fullerenes from soluble impurities, such as polycyclic aromatic hydrocarbons (PAH) and aliphatic species, as well as separating individual fullerene species from other fullerene species.

The methods described above have a number of drawbacks. Organic solvents are expensive and must be disposed of as hazardous waste. HPLC also is expensive due to the high costs of equipment and stationary phase material, and the long time required. Furthermore, handling of the condensed matter for the separation stages can become difficult at larger scales due to the very small particle size of the soot particles (typically in the micron (μm) size range or less), and separation of liquid-borne soot particles is difficult and inefficient for particles in this size range.

Sublimation has also been conceptually demonstrated as a method to purify fullerenes from fullerene extract from arc processes (Dresselhaus et al, "Science of Fullerenes and Carbon Nanotubes," Academic Press, San Diego, p. 118.), and is used to obtain high purity fullerenes from lower purity grades (e.g. 99.9% $C_{60}$ from 99%) Sublimation methods that have been demonstrated operate on collected particulate or condensed matter or collected enriched fullerene product to purify fullerenes by addition of energy through heating (usually 500-1000° C.) at low pressures to dissociate the fullerenes from non-fullerene condensed matter. The vaporized fullerenes are then condensed onto a surface. Energy is required to dissociate fullerenes from a condensate when sublimation is used, material handling is costly, and irreversible losses of fullerenes occur (typically 20%) relative to the recovery of solvent extraction methods.

Fullerenes are typically found embedded in the collected soot particles of the condensed matter (Dresselhaus et al, "Science of Fullerenes and Carbon Nanotubes," Academic Press, San Diego, p. 111). Transmission electron micrographs show that fullerene structures exist on the periphery of and within soot particles collected from a flame (Goel et al., "Combustion Synthesis of Fullerenes and Fullerenic Nanostructures" *Carbon* 40:177 (2002)). It is unclear in the art at which stage in the formation and collection process the embedding of fullerenes into soot particles occurs.

Laser ablation can liberate from soot and soot precursor particles trace amounts of fullerenes that were produced by processes not known to produce fullerenes (Reilly et al., "Fullerene Evolution in Flame-Generated Soot," *J. Am. Chem. Soc.*, 112:11596 (2000)). This observation is consistent with the formation of fullerenes in the condensed phase, i.e., in or on solid particles. Baum et al. in "Fullerene Ions and Their Relation to PAH and Soot in Low-Pressure Hydrocarbon Flames" (*Ber. Bunsenges. Phys. Chem.* 96:841 (1992)) postulate that fullerenes form in the condensed phase. The formation of fullerenes in the condensed phase could explain how fullerenes are found to be embedded in the solid particles.

There is also evidence that fullerenes are consumed by soot in a kinetically driven process, possible including chemical reaction, during the fullerene formation process (Grieco et al. in "Fullerenic Carbon in Combustion-Generated Soot," *Carbon* 38:597 (2000)).

Homann describes spectroscopic in-situ flame observations of fullerenes in trace quantities in non-sooting or low-sooting flames (Gehardt et al., "Polyhedral Caron Ions in Hydrocarbon Flames," *Chem. Phys. Lett.* 137:306 (1987)). Since little or no soot or other solid particulate matter is present in these flames, unlike the flame conditions typically used to produce fullerenes that produce significant amounts of soot, it is not clear from Gehardt et al. whether a significant fraction of fullerenes would be present as gaseous molecules during the formation process before they become embedded in the soot.

The literature on the combustion synthesis of fullerenes teaches that fullerenes are collected along with the soot with which they are associated in the flame, and that the fullerenes must be separated from the soot in post-collection process steps (Howard et al., *Nature* 352:139 (1991); Howard et al., *J. Phys. Chem.* 96:6657 (1992); McKinnon et al., *Combustion and Flame* 88:102 (1992); Richter et al., *J. Chimie Physique* 92:1272 (1995)).

In summary, it is not known whether fullerenes are formed in the condensed phase and so exist embedded in the solid particles, or whether they are formed in the gas phase and subsequently consumed by and/or embedded within the soot particles or agglomerates. Methods in the current art involve energy addition in solvent extraction, sublimation or other post-formation process steps to release the embedded fullerenes.

Lower cost and more effective methods for the separation and purification of fullerenes are desired.

SUMMARY OF THE INVENTION

One or more aspects of the present invention provide methods and apparatus to separate and purify fullerenes from solid particles and condensable impurities and offer significant reductions in the cost associated with the separation. According to one or more aspects of the present invention, the various different fullerenes additionally are separated from one another. The use of solvents and expensive techniques such as HPLC are avoided, and a higher fraction of fullerenes is recoverable. In addition, the handling time and complexity of handling the condensed matter is reduced and no additional energy or processing step is required to separate the fullerenes from the condensed matter.

The present invention is based on the discovery that appreciable quantities of fullerenes exist as free gaseous molecules in flame formation processes at certain locations in the flames, and can be maintained as free gaseous molecules under certain conditions. Fullerenes are separated and purified from the solid soot particles and condensable gaseous impurities in line with the formation process by using a separation and purification process which acts on the gas effluent and adjusts the physical conditions of the gas effluent in conjunction with suitable collection devices. The physical state of the fullerenes is controlled so that they are maintained as gaseous molecules before the separations process until collection is desired.

The present invention provides for the separation and purification of fullerenes by making use of the discovery that, under certain conditions, fullerenes in substantial quantities exist independent of the solid particles suspended in the gaseous effluent of typical fullerene formation processes and the consumption of fullerenes by reaction with the solid and/or condensed material may be properly controlled in the gaseous effluent, thus providing a means of formation and separation/purification of fullerenes. Further, the present invention allows for control of the effluent from the separations device so that a gas/solid phase change occurs, in some cases so that substantially purified fullerene particles are formed, and collection may be accomplished conveniently by particulate collection devices known in the art. Further, the present invention provides for enhancing the yield of fullerenes from combustion and potentially other fullerene formation processes by reducing the irreversible loss of fullerenes and/or promoting formation of fullerenes in the substantial absence of soot as well as from soot (a) suspended in the gas phase, (b) collected and held or confined at high temperature in a filter, in an electrical or magnetic field, or in some other type of trap or by other means, or both (a) and (b). In exemplary cases the yield is enhanced by up to a factor of 2 or more.

In one aspect of the invention, fullerenes are processed by generating a gas stream including suspended soot particles and condensable gases and separating at least a portion of the condensable gases from the suspended soot particles using a gas/solid separations process. The condensable gases include gaseous fullerenes. At least a portion of the fullerenes in the condensable gases are condensed after separation of at least a portion of the condensable gases from soot, and the condensed fullerenes are collected.

In another aspect of the invention, fullerenes are processed by burning a carbon-containing fuel under conditions effective to produce fullerenes and to generate an effluent gas including suspended soot particles and condensable gases, in which the condensable gases include fullerenes, and separating at least a portion of the condensable gases from the suspended soot particles using a gas/solid separations process.

In one or more embodiments, at a least a portion of the fullerenes in the condensable gases are condensed after separation of at least a portion of the condensable gases from soot and the condensed fullerenes are collected.

In still another aspect of the present invention, a method for processing fullerenes is provided in which a carbon-containing fuel is burned in a flame under conditions effective to produce fullerenes and to generate an effluent gas including suspended soot particles and condensable gases, in which the condensable gases include fullerenes, the condensable gases are separated from the suspended soot particles using a gas/solid separations process to obtain condensable gases of reduced soot content, and the condensable gases containing fullerenes are introduced into a subsequent location where further treatment or reaction of the fullerenes is conducted.

In another aspect of the invention, an apparatus for the processing of fullerenes includes a gas effluent source capable of generating a gas effluent including suspended soot particles and condensable gases, in which the condensable gases include fullerenes, an inlet conduit for directing a gaseous effluent to a first separation point, a first gas/solid separation device located at the first separation point, an outlet conduit for directing a gas effluent from the first separation point to a first collection point, a collection device located at the first collection point, and a temperature control for controlling the temperature of the gaseous effluent.

Another aspect of the invention provides a method of cleaning a gas/solids separations device including a filter. The method includes contacting the filter with an oxidative species at a temperature that oxidizes the collected soot during or after separation of soot from a carrier gas and collection of the soot on a filter.

The invention also provides a method of fullerene recovery from soot. The method includes generating a gas stream including suspended soot particles and condensable gases, in which the condensable gases include gaseous fullerenes, separating at least a portion of the condensable gases from the suspended soot particles using a filter contacting the filter with an oxidative species at a temperature that oxidizes the collected soot during or after separation and collection of soot from the condensable gases on a filter and condensing and collecting fullerenes from the condensable gases downstream from the soot filter.

In yet another aspect of the present invention, a method of processing fullerenes is provided including the steps of generating a gas stream including suspended soot particles and condensable gases, in which the condensable gases include gaseous fullerenes, condensing at least a portion of the condensable gases, collecting the soot and condensed condensable gases at a collection location, heating the collected soot and condensed condensable gases to sublime at least a fullerene species, and condensing the sublimed fullerene species.

"Fullerenes" as used herein refers to closed-cage carbon molecules such as $C_{60}$, $C_{70}$ and similar molecules that range in molecular weight from $C_{20}$ up to $C_{84}$, $C_{90}$, and larger such molecules, with shapes ranging from spheroidal to ellipsoidal, elongated and other shapes, and including not only single-walled but also multi-walled cages consisting of stacked or parallel layers. Fullerenes, as used herein, also includes closed-cage carbon molecules with chemical functional groups such as $C_{60}O_n$, $C_{60}(OH)_n$, and metal-containing groups, and endohedral structures with metals or other atoms inside the cage.

"Gaseous fullerenes" or "gas phase fullerenes" and like references refer to those fullerenes that are in the vapor phase under a given set of conditions of temperature and pressure (and other variables). The composition of gaseous fullerenes changes with the given conditions, so that gaseous fullerenes may encompass a subset of all fullerenes.

"Soot" as that term is used herein is a solid particulate carbonaceous material containing primarily carbon but including hydrogen, oxygen and other elements depending on the composition of the material from which the soot is formed. Combustion-generated soot contains significant amounts of hydrogen and some oxygen, as well as trace amounts of other elements that are present in the flame. Soot produced in carbon vaporization or other fullerenes synthesis processes may contain smaller amounts of oxygen and hydrogen and various amounts of other elements depending on the purity of the carbon source material. The soot structure consists primarily of layers of polycyclic aromatic carbon which, depending on the formation conditions, may be planar or curved, and some of each shape may be present in various amounts. The layers exhibit various degrees of mutual alignment ranging from an amorphous structure early in the formation process to an increasingly crystal-like structure, either graphitic (planar layers), fullerenic (curved layers), or some of both, as residence time at high temperature increases. The soot structure may also include lesser amounts of aliphatic carbon such as functional groups and cross links in polycyclic aromatic material and long chain hydrocarbons. The soot particle is an aggregate or agglomerate of approximately spheroidal units referred to as primary particles or spherules. The number of spherules per aggregate can be as small as one or as large as 100 or more, and the shape of the aggregate can range from single-strand chains of spherules to branched chains and grape-like clusters, depending upon formation conditions. Soot, as used herein, may include closed-cage and open-cage nanostructures having multiple nested or parallel layers or walls, shapes ranging from spheroidal to elongated, including onion-like nanoparticles with similar dimensions in all directions and cylindrical nanotubes which are elongated structures with length-to-diameter ratios of 5 or larger. The nano prefix refers to dimensions in the nanometer range.

"Condensed matter" as that term is used herein means soot and other species physically condensed with it. The range of molecular weights or volatilities of the species physically condensed with the soot depends on the level of saturation of the species in question. For example, at 400° C. and 1 atm, the species physically condensing with soot will include most all the fullerenes and the larger polycyclic aromatic hydrocarbons (PAH). When the soot is collected and held at typical fullerene forming flame temperatures and pressures, polycyclic aromatic hydrocarbons and fullerenes such as $C_{60}$, $C_{70}$, $C_{84}$ and similar molecules typically do not physically condense with soot, but multilayered nanostructures do. At room temperature, species condensing with the soot include PAH, some aliphatic compounds, and some water.

"Gas effluent" or "gas stream" as that term is used herein means the gaseous and suspended or entrained solid particulate products of a fullerene formation process. The gas effluent may undergo further physical and chemical transformation once it has left the fullerene formation zone.

The term "about" is used herein to mean approximately, in the region of, roughly or around. When the term "about" is used in conjunction with a numerical range, it modifies that range by extending the boundaries above and below the numerical values set forth. In general, the term "about" is used herein to modify a numerical value above and below the stated value with a variance of 10%.

BRIEF DESCRIPTION OF THE DRAWING

Various objects, features, and advantages of the present invention can be more fully appreciated with reference to the following detailed description of the invention when considered in connection with the following drawings, in which like reference numerals identify like elements. The following drawings are for the purpose of illustration only and are not intended to be limiting of the invention, the scope of which is set forth in the claims that follow.

DETAILED DESCRIPTION OF THE INVENTION

In one aspect of the present invention, the separation of fullerenes from the solid phase is accomplished by identifying the location after an initial stage of fullerene formation (hereinafter, "post-formation") process where a significant fraction of fullerenes exist as gaseous molecules and collecting the solid reaction products e.g., soot and other condensed impurities, of the fullerene formation process at this location.

The solid particles are thereby separated from the fullerene-containing gas phase. Thus, reactions or condensation of the fullerenes that result in fullerene loss due to chemical reaction, physical adsorption or embedding of the fullerene in or on the soot particles, or agglomeration of the soot particles leading to the embedding of fullerenes, are avoided. The post-formation conditions of the gas effluent of the fullerene formation process are controlled to provide desired soot growth, and/or PAH reaction and/or PAH elimination, and/or fullerene formation. Fullerenes are recovered from the gas phase by condensing the fullerenes to form suspended particles and collecting the fullerenes with a second gas/solid separation process, or collecting the fullerenes on a condensing surface.

One or more embodiments of the present invention are described with reference to flow chart 100 of FIG. 1.

Figure 1:
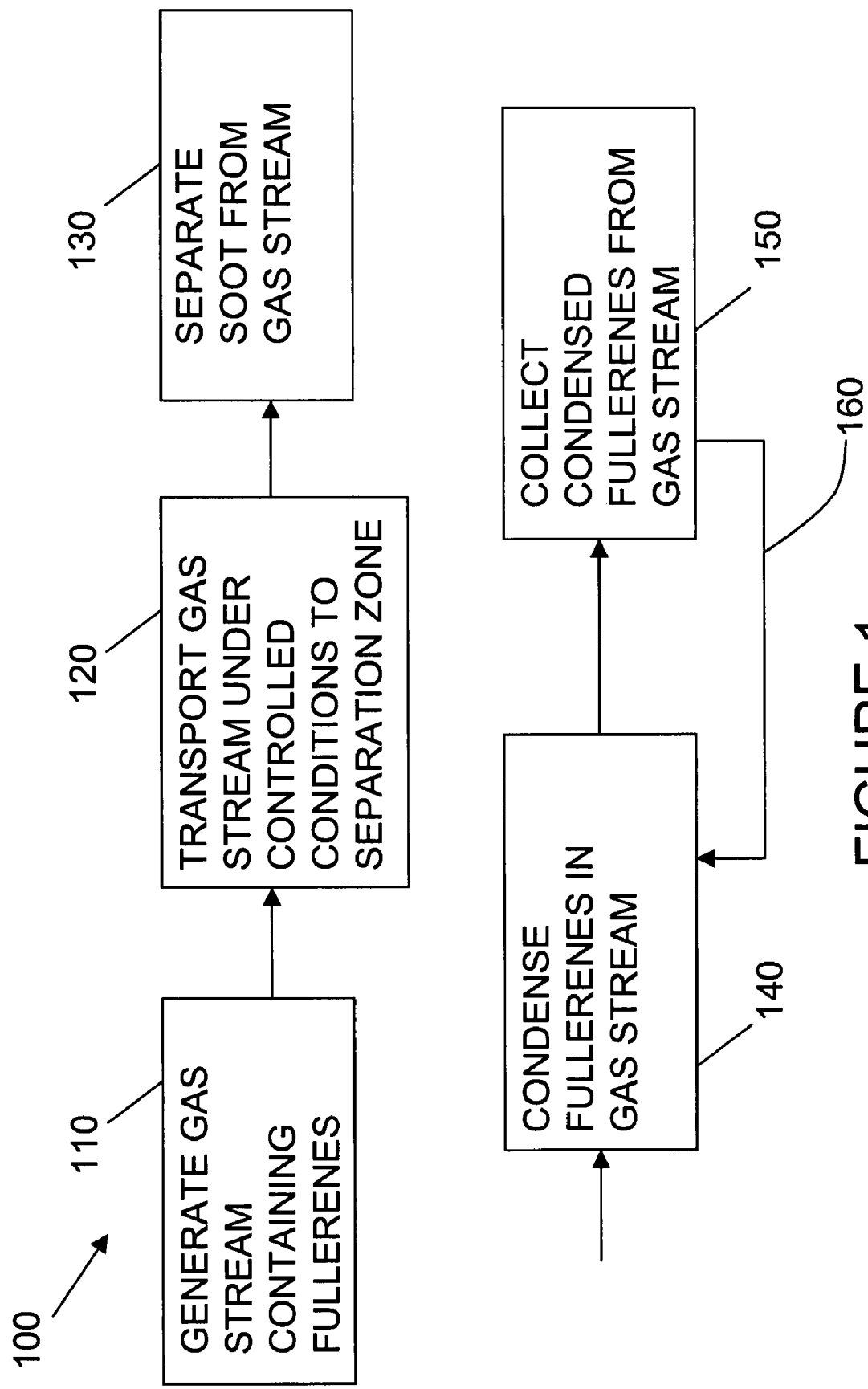
FIG. 1 is a flow diagram generally illustrating a separation and purification process according to one or more embodiments of the present invention.

Referring to step 110 of FIG. 1, the method includes a fullerene formation step in which gas phase fullerenes are formed in a gas stream. The gas stream includes other components such as soot particles and other condensable impurities. The soot is present in the gas steam as suspended solids, however, the condensable materials may be present in a variety of forms, such as gas molecules, condensed particulate solids, or adsorbates on solid materials, e.g., soot.

Gas phase fullerenes can be generated using any conventional fullerene formation processes that generates and maintains fullerenes in the gas phase prior to separation from solid soot particles. Suitable methods include but are not limited to, laser ablation, arc discharge, burning graphite, negative ion/desorption chemical ionization and combustion. Modifications to conventional processes may be required to avoid premature condensation of condensable gases and to maintain fullerenes in the gas phase prior to and during gas/solids separation. For example, arc discharge can be conducted in an environment heated to a temperature above the vaporization temperature of fullerenes. For simplicity and without limitation, the invention is described with reference to combustion synthesis of fullerenes.

With reference to step 120, the effluent gas generated in the fullerene formation process is transported downstream from the site of fullerene formation to a first separation zone via a first transfer zone. The transfer zone is typically a conduit such as a pipe or tube. As noted above, generation of fullerenes is typically accompanied by the formation of soot and other condensable impurities. It is known in flame processes that fullerene concentrations, soot growth, and PAH concentrations depend on temperature and residence time in the flame. Thus, residence time and gas temperature in the transfer zone are factors to control when providing conditions that make the separations process efficient. The transfer zone provides an environment having a residence time and temperature suitable for the reduction of PAH (by chemical reaction with or adsorption of the PAH onto soot particles, or other consumptive processes), for soot particle growth, and for further fullerene formation. Soot particle growth improves effectiveness of soot recovery in subsequent steps.

The temperature is controlled during transport to maintain the gas stream at an optimal temperature, i.e., to maintain the fullerenes in a gas phase and/or to promote reactions that reduce the amount of PAH in the gas stream, and/or promote soot growth, and/or promote fullerene formation. Exemplary conditions for the reduction of PAH content in the gas stream, growth of soot particles, and formation of fullerenes include residence times in the transfer zone in the range of about 10 ms to about 10 s, or about 100 ms to 2 s, and temperatures in the range of about 500° C. to about 2200° C., or in the range of about 900° C. to about 1700° C. Additionally, other processing conditions can be controlled during this stage of the process, such as but not limited to, introduction of reactive species such as halogenated compounds or inert gases or vapor, such as water, nitrogen, argon and the like, for control of particle and condensable gas concentrations, and/or for temperature control by heating or cooling (by, e.g., dilution with hot or cold gases or by expansion cooling).

Gas phase fullerenes are separated from soot particles in a first separation zone of the separations process using a gas/solids separation technique as shown in step 130.

The gas/solid separation may be any conventional technique, including without limitation, filtration, e.g., sieve filtration and packed bed filtration, electrostatic precipitation, electrostatic separation, thermophoresis, or inertial methods such as impaction separation and cyclone separation. In one or more embodiments, soot particles are trapped or retained using a particulate trap or filter. One or more separation steps may be used; and one or more separations techniques may be employed in the separation of suspended solids from the effluent gas.

In one or more embodiments of the present invention, suspended soot is substantially removed from the gas stream by this process. In one or more embodiments, particles ranging in size from about 0.1 μm to about 500 μm and even larger are separated from the effluent stream with high efficiency, for example, at least 95% removal, or at least 99% removal, or about 99.9% removal of soot from the effluent gas. In addition to soot, other condensable impurities, e.g., PAH, may be collected at the filter or otherwise removed from the gas stream, for example, by reacting the condensable impurities with soot or by condensing the condensable impurities onto soot particle surfaces.

Temperature and other process conditions are monitored and controlled so that the desired condensable products, including gaseous fullerenes, remain in the gas phase and pass through the separation zone. Gaseous fullerenes are those fullerenes that are in the gas phase at the separations zone and that are acted upon in subsequent collections steps. The gaseous fullerenes can be a subset of total fullerenes in the gas stream. In one or more embodiments, the temperatures of the gas stream and of the gas/solid separations process are selected to preferentially maintain as gaseous a subset of the total fullerenes.

Separation temperatures can be in the range of about 300° C. to about 2000° C. In embodiments where further formation of fullerenes is promoted after the first gas/solid separation of soot, temperatures would be preferred in the range from about 900° C. to 2000° C. In embodiments where formation is not further promoted, the preferred range is about 500° C. to about 900° C. The separations process can be conducted under conditions of optimal fullerene stability where consumption of fullerenes by soot particles or other species is minimized and thus the concentration of gas phase fullerenes is maximized. Consumption of fullerenes or embedding (meaning a consumptive process whereby fullerenes are physically bonded to soot or occluded by soot) of fullerenes is minimized by controlling the residence time, temperature, or other conditions, such as gas velocity of the gas/solid separation. Preferably, the gas/solids separations occurs on a timescale that does not allow enough residence time for consumption or embedding processes to occur during the gas/solids separation. This is accomplished by filtering or otherwise separating the soot from the effluent gas quickly relative to the time it takes for the undesirable processes of fullerene consumption or embedding to occur. Rapid separation time prevents significant interaction of the fullerenes with soot that lead to fullerene losses.

In one or more embodiments, a portion or fraction of fullerenes are separated from the condensable gases with the soot. In exemplary embodiments, the separations process is operated under conditions that permit $C_{60}$ and more volatile species to pass through the gas/solids separation process, while the higher molecular weight fullerenes are separated from the gas stream with the soot at the gas/solid separation zone. Purity of the collected $C_{60}$ fraction with respect to higher fullerenes is about 70% to about 95%. In other exemplary embodiments, the separations process is operated under conditions (typically higher temperatures) that permit $C_{60}$, $C_{70}$ and other more volatile species pass through the gas/solids separation process while the higher molecular weight fullerenes are separated from the gas stream with the soot at the gas/solid separation zone. The fullerene-enriched effluent gas contains $C_{60}$ and $C_{70}$, plus more volatile condensable gases, with purities from about 85% to about 99% with respect to fullerenes of higher volatility than $C_{70}$. In other exemplary embodiments, substantially all fullerene species, including the fullerene species $C_{90}$ and more volatile, pass through the fullerene filter in quantities up to 100% of the total concentration.

The gas/solid separator can also function as a concentrator in which the soot and other suspended particles are concentrated in a fraction of the effluent gas. The remaining fraction of the effluent gas contains a diluted or lesser amount of suspended particles and is concentrated in fullerene content. In exemplary embodiments, condensable gases are partitioned into a fraction having low soot content, e.g., about 10-70 wt % fullerenes, while the remaining fraction of the effluent gas is enriched in soot and other suspended particles. This could be accomplished by a cyclone concentrator or electrostatic separator, and also could be operated as a first, rough separations, which is followed by a similar or different gas/solid separation device.

Referring now to step 140, the substantially particulate-free or reduced-particulate gases exiting the separation zone enter a condensation zone in which conditions, such as temperature, are controlled to condense fullerenes so that they may be collected in collection step 150. The condensation zone is typically a conduit such as a pipe or tube, for which the temperature is controlled or maintained at a temperature in the range of about minus 250° C. to about 1200° C., or about 100° C. to about 800° C. resulting in the condensation of fullerenes. In one or more embodiments, the temperature within the condensation zone is graded from a higher temperature at the exit end of the separations process to a lower temperature at the collection stage. In one or more embodiments, the condensed fullerenes have sufficient velocity and are of a particle size such that they do not substantially deposit on the conduit walls or other surfaces.

The condensed fullerenes are collected as particles in the collection separation step 150. The particles may comprise only fullerenes, or they may include a nucleation core, or otherwise constituted particle that contains a non-fullerene solid, e.g., soot particle.

Collection is accomplished using a gas/solids separation technique, including without limitation, filtration, e.g., sieve filtration and packed bed filtration, electrostatic precipitation, electrostatic separation, thermophoresis, or inertial methods such as impaction separation and cyclone separation. One or more collection steps may be used; and one or more collection techniques may be employed in the separation of suspended solids from the effluent gas. In one or more embodiments, fullerenes are collected by condensation and deposition on a surface, such as a condensation plate or coil.

The collected condensed solids are enriched in fullerenes. Any degree of enrichment is possible, ranging from slight enrichment of fullerenes (over effluent gas composition) to substantially pure fullerenes. Purities of collected fullerenes according to one or more embodiments of the present invention range from about 65% to about 90%, or from 99%, or even about 99.9%, or even up to 100% with respect to soot. Purities of collected fullerenes range from about 99%, to about 99.9%, and to about 99.99% with respect to PAH.

Multiple steps under differing conditions for the collection of different fullerene fractions also are contemplated by the present invention, as is indicated by arrow 160. In one exemplary embodiment, the temperature of the effluent gas is controlled such that the less volatile fullerenes condense and are collected in a first condensation and collection step. Temperature of the resultant effluent gas then is lowered to condense a more volatile fullerene fraction, which is then collected in a second condensation and collection step. This process can be repeated multiple times for each fullerene fraction. Also, multiple fullerene species may be collected at each step, representing a set of fullerenes with lower volatility than a given species. When higher or lower volatility is referred to herein, it is meant that the vapor pressure at a given temperature for a species allows it to be separated to a certain extent, and it may include condensing about half the amount of a given species and substantially all of the species less volatile.

In one or more embodiments, condensation and collection of non-fullerene condensable species is accomplished subsequent to collection of the fullerene species in the collection step. The non-fullerene species can be polycyclic aromatic hydrocarbons. Alternatively, non-fullerene condensable gases may be condensed and separated prior to the fullerene collection step, e.g., by condensation on the conduit wall.

Furthermore, although not required by the invention, it is contemplated that the fullerenes separated, collected and/or purified as described herein may be further processed or purified using conventional techniques, for example, by HPLC.

Figure 2:
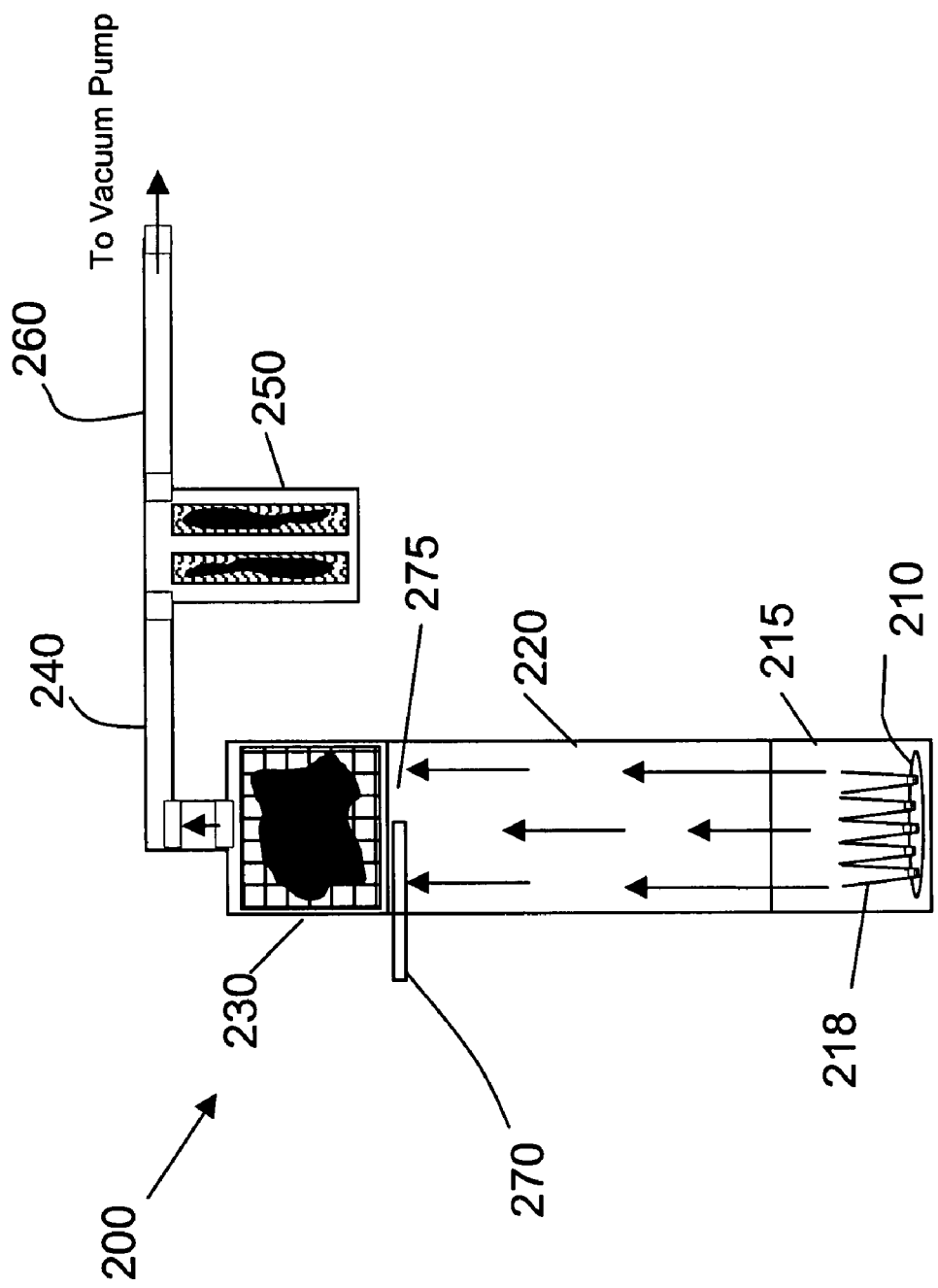
FIG. 2 is a schematic illustration of a fullerene production system that is coupled with a gas/solids separation and purification system according to one or more embodiments of the present invention.

FIG. 2 is a schematic illustration of a coupled fullerene formation and purification system 200 for use in a gas/solid separations—fullerene purification process such as described above. Fullerene formation can be accomplished by combustion synthesis, using a water-cooled burner 210 in a low-pressure combustion chamber 215. A fullerene-forming flame 218 is produced by combustion of a fullerene-forming fuel under appropriate combustion conditions. Variables that are controlled for the formation of fullerenes include burner chamber pressure, fuel and oxidant flow rates, gas velocities, and phi (defined by the relationship (actual fuel/oxidant)/(stoichiometric fuel/oxidant)). Further information on flame combustion is found in U.S. Pat. No. 5,273,729, which is incorporated herein by reference. A suitable combustion chamber including a jet burner is described in Published International Application No. WO 03/021018, which is incorporated herein by reference.

Combustion chamber 215 is coupled to a conduit 220 that provides passage of the combustion gas stream from the combustion chamber 215 to the gas/solid separator 230. The conduit 220 provides residence time for the gases under controlled conditions, e.g., temperature, gas velocity, etc. for the reduction of PAH, soot particle growth and fullerene formation. The dimensions of the conduit vary according to the characteristics of the combustion chamber and the properties of the exiting combustions gases. In one or more embodiments, the conduit can be selected to provide a residence time in the range of about 10 msec to about 10 sec, or about 100 msec to about 2 sec, and a temperature in the range of about 500° C. to about 2200° C., or in the range of about 900° C. to about 1700° C.

The conduit 220 is in flow communication with a solid/gas separator 230, which is represented in FIG. 2 as a filter. As noted previously, the solid/gas separator can be any conventional separator that can be operated under the high temperatures (and other conditions) of the fullerene separations process. In one or more embodiments, the solid/gas separator is a sieve filter, fiber filter, or a packed bed filter, and the filter has, for example, a mean effective pore size in the range of about 1 µm to about 100 µm. The filter can be a ceramic particulate filter, which provides temperature stability. By way of example only, the filter can be made up of cordierite, silicon carbide, alumina and alumina/silica composites. The filter is maintained at a temperature that permits desired condensable products to pass through the filter. In one or more embodiments, the filter is designed for use at temperature of greater than about 300° C. and is operated at a temperature in the range of about 400° C. to about 1000° C. The temperature of the separator is controlled by the temperature and flow rate of entering gases and heat transfer from the separator to the surroundings. Other means of temperature control are envisioned by the present invention. One or more gas/solid separation stages can be used. Typical high-temperature particulate emissions devices, such as are used for diesel exhaust, are well-suited for use in the present invention.

The gas/solid separator 230 is coupled to a second conduit 240 that directs the soot-filtered effluent gases to a collector 250. As above, the collector can be any conventional separator that can be operated under the temperatures (and other conditions) of the fullerene separations process. In one or more embodiments, the collector is a filter, and the filter has, for example, a mean effective pore size in the range of about 1 µm to about 50 µm. In one or more embodiments of the present invention, the collector is a packed bed or metal mesh filter. In another embodiment, the collector is a cyclone separator or an electrostatic precipitator (not shown) that efficiently collects particles in the size range of 1 µm or less.

The collector 250 collects mixed fullerenes and traces of other condensable gases. As is discussed above, the temperature of the conduit 240 is selected to condense fullerenes of a desired volatility. The remaining gas stream passes through exit conduit 260 to the vacuum pump (not shown). In or after exit conduit 260, residual portions of the gas may be collected as needed.

Figure 3:
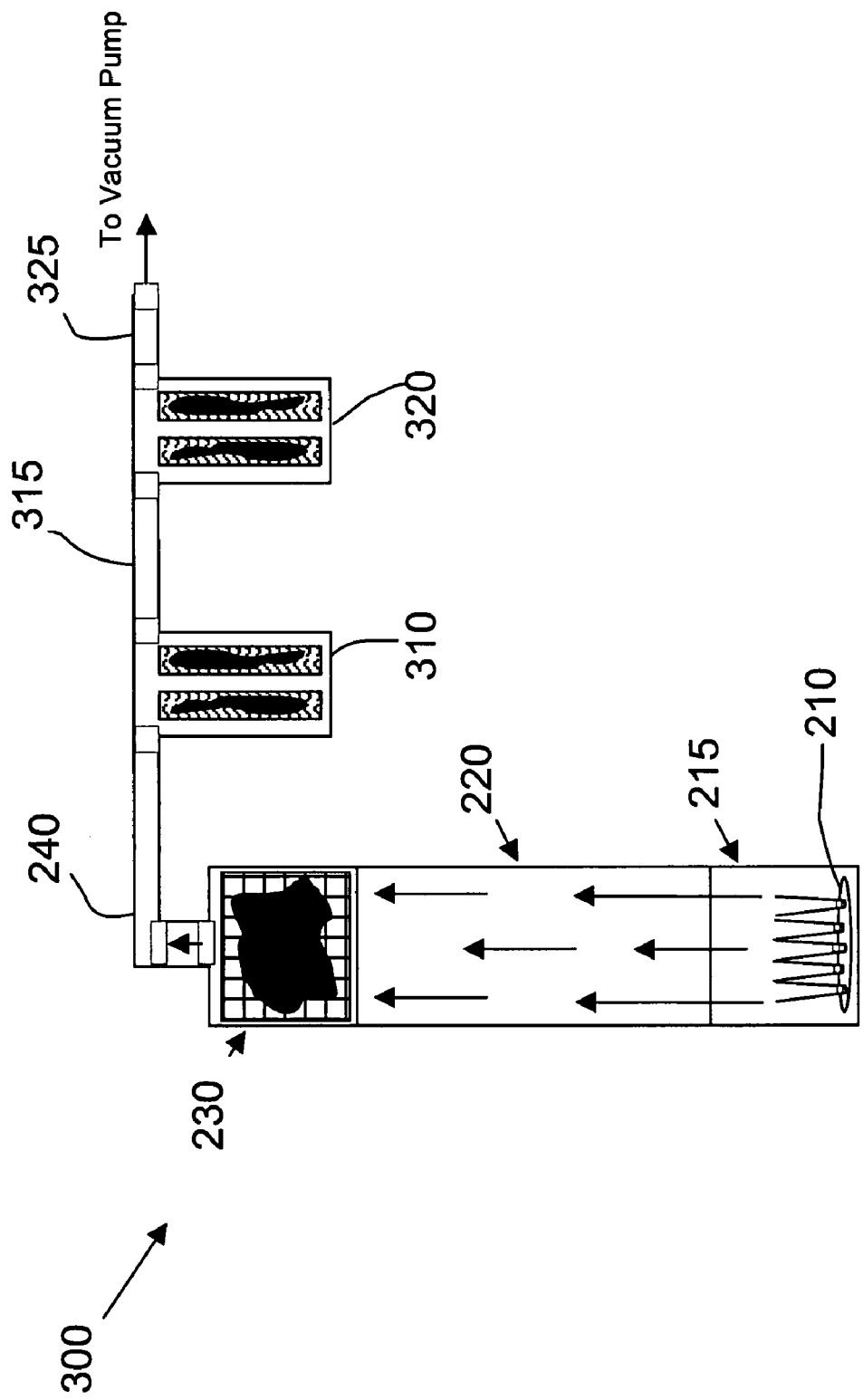
FIG. 3 is a schematic illustration of a fullerene production system that is coupled with a gas/solids separation and purification system for obtaining two or more fullerene fractions of different volatility or molecular weight according to one or more embodiments of the present invention.

In one or more embodiments of the present invention, two or more fullerene collection zones are provided to collect different fullerene fractions, as is illustrated in system 300 of FIG. 3. As for the system described in FIG. 2, fullerenes are formed by combustion synthesis, using a water-cooled burner 210 in a low-pressure combustion chamber 215. The combustion chamber 215 is coupled to a conduit 220 for passage of the combustion gas stream from the combustion chamber 215 to a gas/solid separator 230. The gas/solid separator 230 is coupled to a second conduit 240 that directs the soot-filtered effluent gases to two or more fullerene collectors 310, 320 that collect fractions of different fullerene composition.

Partitioning of the total fullerenes into different fractions can be accomplished by control of the gas stream temperature and/or use of different separations conditions or techniques at each separations stage. For example, the separations stages can use filters of different pore size, or can filter at different temperatures.

In one or more embodiments, partitioning the total fullerenes produced into two fractions, one containing $C_{70}$ and less volatile fullerenes and the other containing primarily $C_{60}$ and more volatile fullerenes, is accomplished by (1) controlling the temperature of the gas exiting soot filter 230 in the region 240, such that it is below the saturation temperature for fullerenes $C_{70}$ and less volatile fullerenes, (2) collecting these fullerenes in collector 310, (3) controlling the temperature of the gas exiting collector 310 in conduit 315 so that the remaining fullerenes that are more volatile than $C_{70}$, including $C_{60}$ and more volatile fullerenes, condense, and then (4) collecting the second fraction of fullerenes in collector 320. Because fullerenes of varying molecular weight have different saturation curves and condensation temperatures at a given gas condition, it is possible to control gas effluent temperature and filter temperature to selectively condense fullerenes of predominantly one volatility or molecular weight range.

Purities in one embodiment where fullerenes $C_{70}$ and higher were first condensed and collected and fullerenes $C_{60}$ and lower were then condensed and collected, resulted in purities of the first collected fraction of about 96% $C_{70}$ with respect to $C_{60}$, and purities in the second collected fraction of $C_{60}$ of about 94% with respect to fullerenes less volatile than $C_{60}$. Other exemplary embodiments contemplate the condensation and collection of fullerene fractions containing substantially purified $C_{84}$ and less volatile fullerenes, substantially purified $C_{78}$, substantially purified $C_{76}$, substantially purified $C_{70}$, substantially purified $C_{60}$, etc., or any combination of individual fullerene species and mixtures.

According to one or more embodiments, the gas stream exits the gas/solid separator 230 at a temperature in the range of about 500° C. to 800° C., or between about 600° C. and 700° C. and can be further cooled to approximately 100° C. to 550° C., or about 420° C. to 470° C. in conduit 240 before entering the first fullerene collector 310. The gas exiting the first fullerene collector can be further cooled in conduit 315 to a temperature in the range of between about minus 250° C. and about 300° C. before entering the second fullerene collector 320. Temperature control can be achieved in a variety of ways, for example by conductive heat loss through the conduit walls, addition of liquids to provide latent heat cooling (heat absorption by phase change), or addition of gases to provide diluent cooling or expansion cooling.

Figure 4:
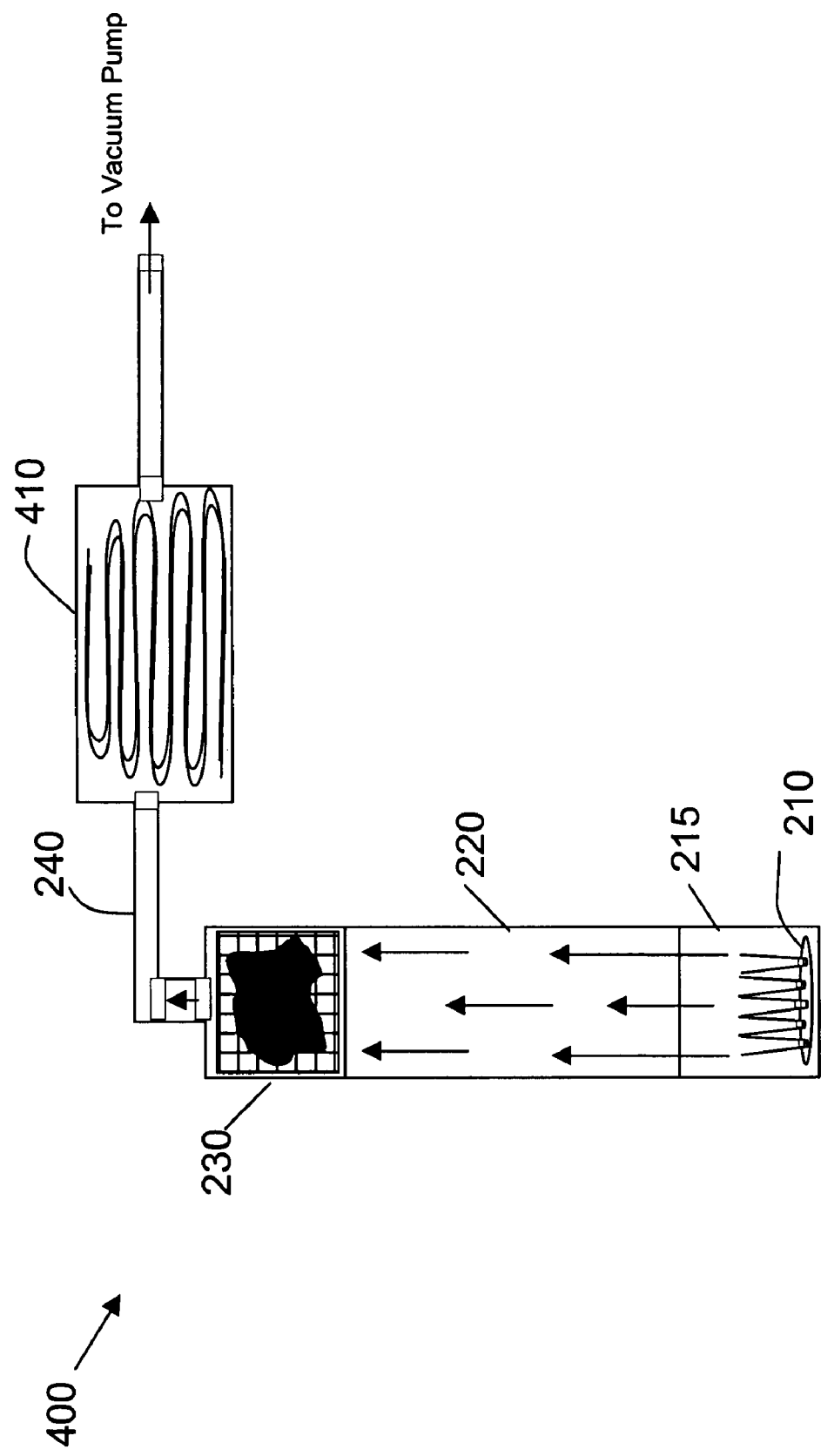
FIG. 4 is a schematic illustration of a fullerene production system that is coupled with a gas/solids separation and purification system according to one or more embodiments of the present invention.

FIG. 4 is a schematic illustration of another method and system according to one or more embodiments of the present invention, in which system 400 uses a condenser coil 410 to simultaneously condense and collect fullerenes. As in the embodiment described above, fullerene formation can be accomplished by combustion synthesis, using a water-cooled burner 210 in a low-pressure combustion chamber 215. The combustion chamber 215 is coupled to a conduit 220 for passage of the combustion gas stream from the combustion chamber to a gas/solid separator 230. The gas/solid separator 230 is coupled to a second conduit 240 that directs the soot-filtered effluent gases to a condenser coil 410, where fullerenes in the condensable gas are condensed and deposited on the condenser coil. Thus, the coils serves to simultaneously condense and collect the fullerenes.

The condenser coil 410 can be a hollow tube through which a fluid is passed to maintain the coil at a desired temperature. The cooling fluid is selected based upon the volatility of the fullerene fraction to be condensed. Multiple condenser units are also contemplated. In multiple coil configurations, coils can be maintained at different temperatures by controlling temperature of fluid traveling through each coil. The different temperatures of the condenser coils permit the collection of different fullerenes or other gases. In one or more embodiments of the present invention, any temperature controlled surface could be used, i.e. non-fluid controlled cooling plates.

Figure 5:
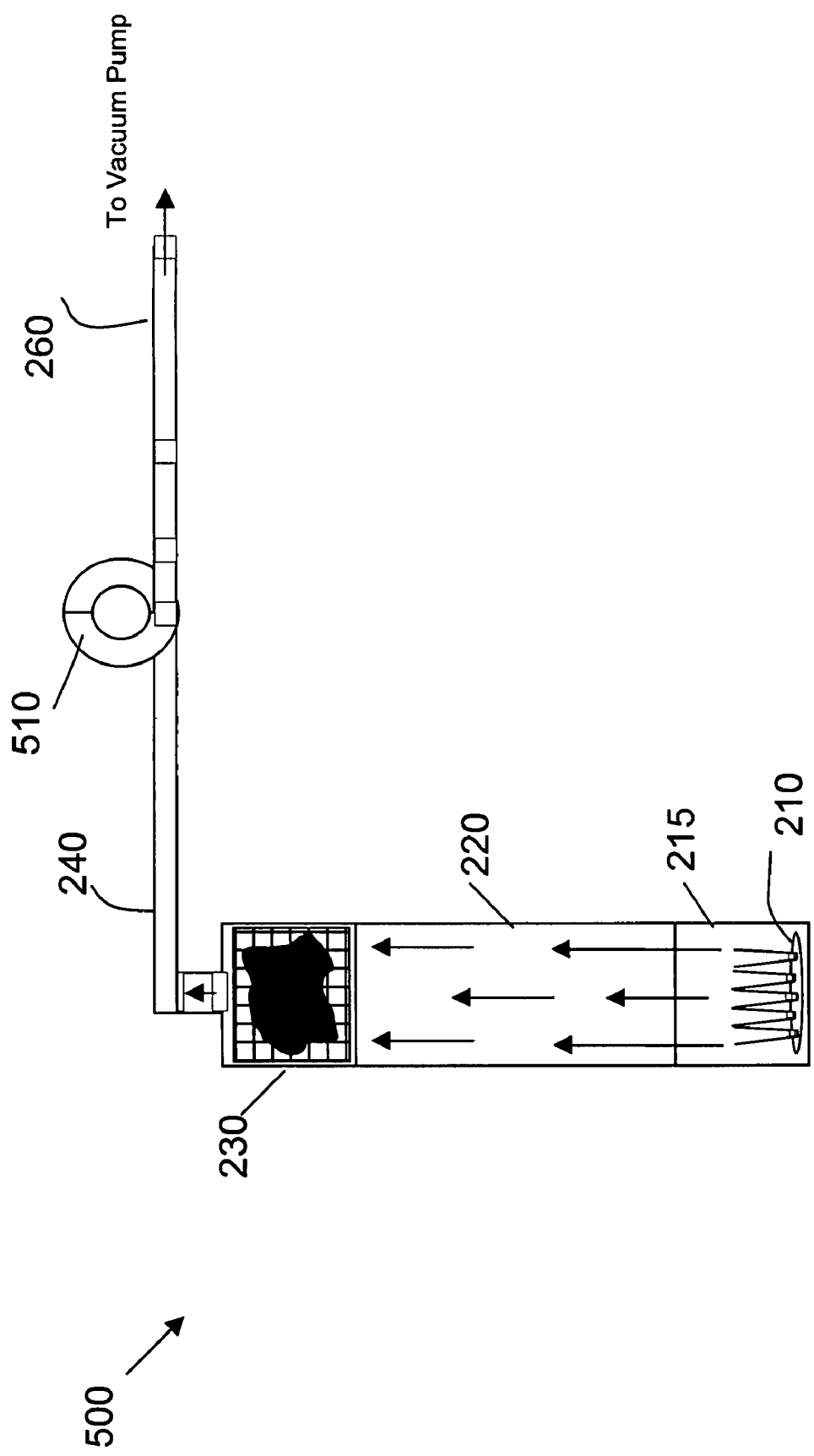
FIG. 5 is a schematic illustration of a fullerene production, separation and collection system including a cyclone-type loop separator according to one or more embodiments of the present invention.

FIG. 5 is a schematic illustration of another method and system according to one or more embodiments of the present invention, in which system 500 uses a cyclone-type separator 510, either alone or in conjunction with a filter 250, for the condensation and collection of fullerenes. As in the embodiments described above, fullerene formation can be accomplished by combustion synthesis, using a water-cooled burner 210 in a low-pressure combustion chamber 215. The combustion chamber 215 is coupled to a conduit 220 for passage of the combustion gas stream to a gas/solid separator 230. The gas/solid separator 230 is coupled to a second conduit 240 that directs the soot-filtered effluent gas into conduit 240 where the conditions are selected to condense at least a portion of the condensable gases from the effluent gas streams in the manner described above.

The effluent stream containing the entrained condensed particles then passes into the loop 510, which approximates a cyclone separator. The particle-laden air is subject to centrifugal forces which direct particles to the outside walls and thereby separate the particles based upon their Stokes number in the gas stream and the gas velocity and physical dimensions of the cyclone. In one example of this embodiment, 66% of the fullerenes were separated from the gas stream. See, Example 5. In one or more embodiments, the cyclone separator is used in conjunction with other collection methods, such as filtration. In one or more embodiments, a cyclone separator is used as a rough separator, to remove a portion of the suspended solids of a given larger size range, and a subsequent separator used to collect suspended solids of a different, and smaller size range. It is well known in the art that suspended solids have a distribution of sizes, with varying amounts of different sized particles.

Figure 6:
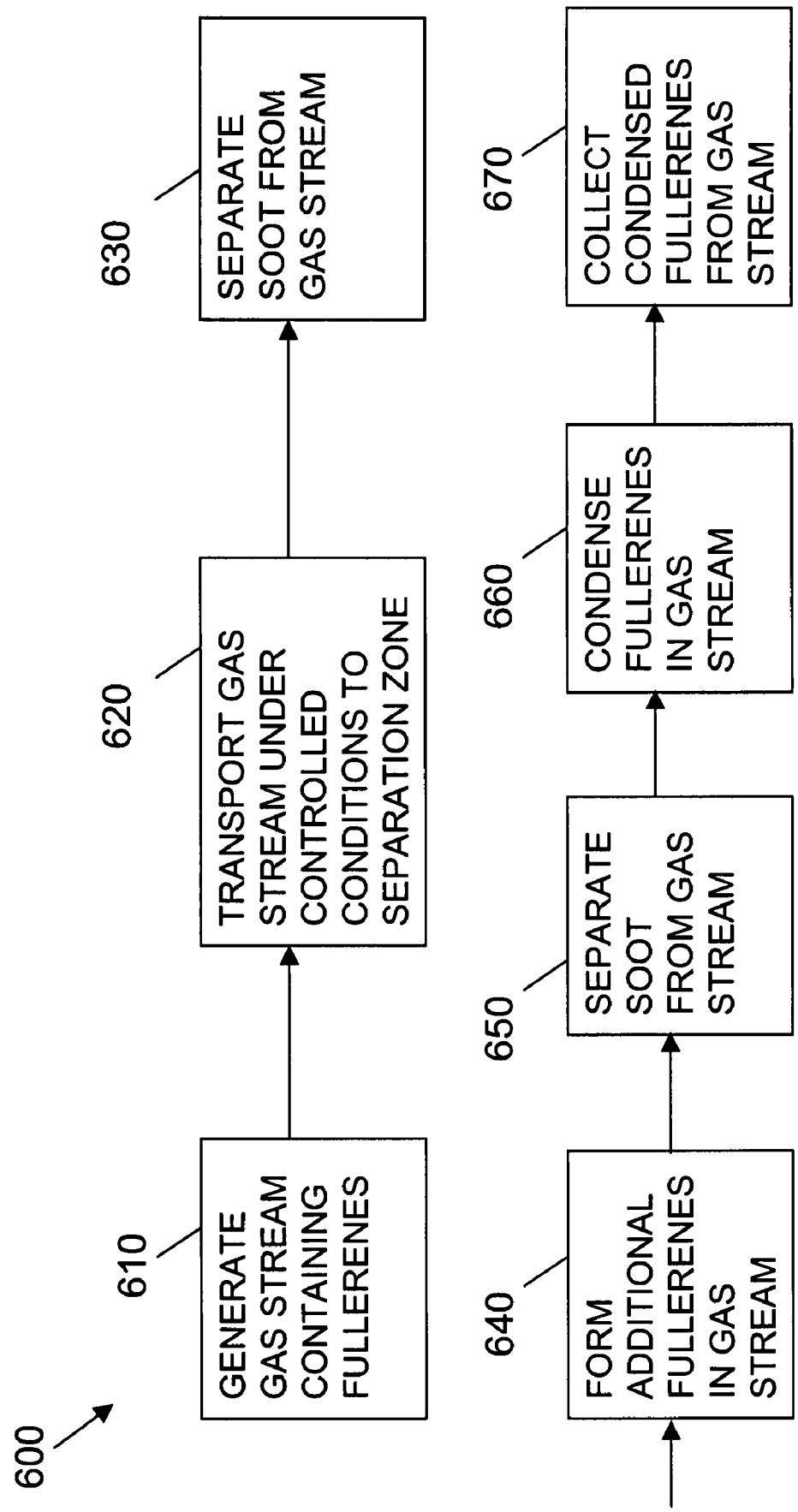
FIG. 6 is a flow diagram generally illustrating another separation and purification process according to one or more embodiments of the present invention.

FIG. 6 is a flow diagram 600 illustrating a process employing multiple gas/solid separation processes according to one or more embodiments of the present invention. As in previous embodiments and with reference to step 610, the method includes a fullerene formation step in which gas phase fullerenes are formed in a gas stream. With reference to step 620, the effluent gas generated in the fullerene formation process is then transported downstream from the site of fullerene formation to a first separation zone via a first transfer zone. The transport of the gas stream between the formation zone and the first separation zone provides an environment having a residence time and temperature suitable for the reduction of PAH (by chemical reaction with or adsorption of the PAH onto soot particles, or other consumptive processes), for soot particle growth, and for further fullerene formation. Soot particle growth improves effectiveness of soot recovery in subsequent steps. Gas phase fullerenes are separated from soot particles in a first separation zone of the separations process using a gas/solids separation technique as shown in step 630.

In some instances, the filtered gas still contains a significant amount of PAH, acetylene and radical species, and other species. In one or more embodiments, the first gas/solid separations process occurs at a location where fullerene formation and/or fullerene stability is suboptimal, so that a significant amount of non-fullerene gas species are present in the filtered effluent. Under fullerene-forming conditions, it is possible to convert these non-fullerene gas components into fullerenes. This serves the dual purpose of reducing impurity content of the effluent gas and increasing fullerene yield. To this end as shown in step 640, the effluent gas is maintained under fullerene forming conditions after the first gas/solids separation process so that so that additional fullerenes are formed. Temperatures in the transition zone are maintained at about at about 500° C. to 2200° C., or about 900° C. to 1700° C.

In one or more embodiments, the heat-treated effluent gas, which now contains an enhanced level of fullerenes, is condensed (step 660) and the condensed gases are collected in step 670. In one or more embodiments, an optimal second gas/solids separation is carried out before condensation and collection of the fullerenes. In one or more embodiments, fullerenes are formed in step 660, and also varying amounts of impurities, such as PAH and/or soot, as a by-product of fullerene formation. These impurities may or may not be present in larger amounts than produced in the process described in FIG. 1. Soot is typically a by-product of fullerene formation, and the effluent gas is separated from the soot in a second gas/solid separation step as is shown in step 650. Alternatively the soot formed in the second formation region may not be of sufficient quantity to require separation from the gas effluent. The substantially particulate-free gases are condensed (step 660), and condensed particles are collected in step 670.

Figure 7:
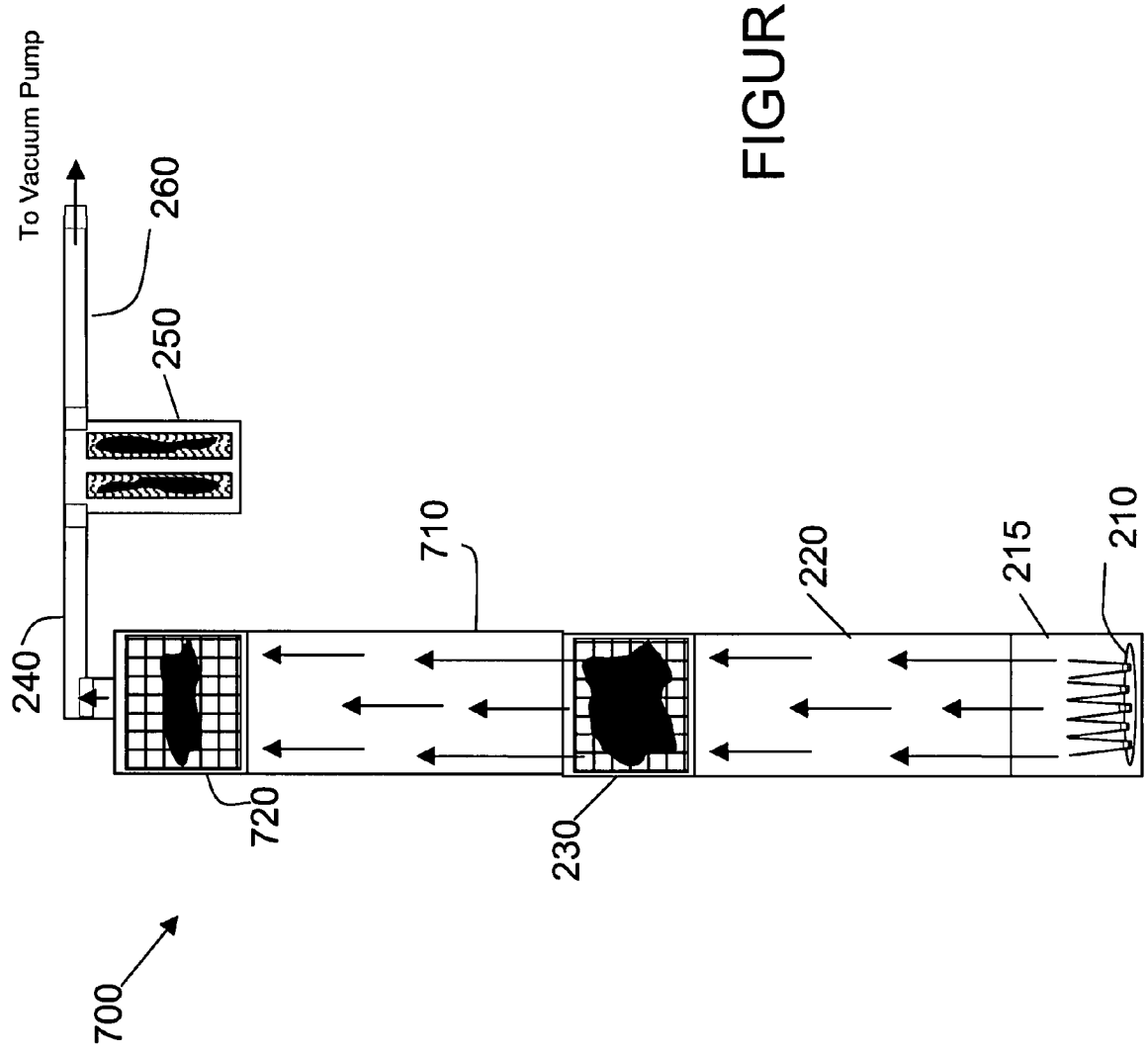
FIG. 7 is a schematic illustration of a fullerene production system that is coupled with two or more gas/solids separators in a fullerene separation and purification system according to one or more embodiments of the present invention.

FIG. 7 is a schematic illustration of an exemplary system 700 that can be used to implement at least the process described in flow diagram 600. As is described above in greater detail, fullerene formation can be accomplished by combustion synthesis, using a water-cooled burner 210 in a low-pressure combustion chamber 215. The combustion chamber 215 is coupled to a conduit 220 for passage of the combustion gas stream from the combustion chamber to a gas/solid separator 230. Separator 230 can be located close to combustion chamber 215 so that substantial amounts of fullerene precursors remain in the gas stream after soot separation. Separator 230 is in flow communication with transition zone 710 which is maintained at conditions conducive to fullerene formation, so that fullerene precursors react to form fullerenes. The gas stream is substantially reduced in soot content, so that the risk of fullerene loss by reaction with or embedding in soot is significantly reduced. Any soot that may have formed in the transition zone 710 is separated from the gas stream at gas/solid separator 720.

The gas/solid separator 720 is coupled to a second conduit 240 that directs the soot-filtered effluent gases to collector 250. The collector 250 collects mixed fullerenes and traces of other condensable gases. As is discussed above, the temperature of the conduit 240 is selected to condense fullerenes of a desired volatility. The remaining gas stream passes through exit conduit 260 to the vacuum pump (not shown). In or after exit conduit 260, residual portions of the gas may be collected as needed.

In one or more embodiments, the coupled fullerene production and separations process can be carried out continuously or in a batch process, or in a steady state or in a non-steady state mode with respect to the physical variables of the gas streams, e.g., temperature, gas velocity, gas concentration, etc. In the event that the soot filter becomes loaded or clogged, as is typically noted by an increase in pressure drop across the filter, the soot filter can be regenerated by oxidation (combustion) of the soot. Soot is consumed by flowing an oxidizing gas (e.g., oxygen or air) over the soot filter at temperatures high enough to support oxidation. The soot filter can be thermally regenerated using air heated to temperatures in the range of about 100° C. to about 900° C., or in the range of about 500° C. to about 800° C., at flow rates in the range of about 10 SLPM to about 1000 SLPM. The regeneration cycle time depends on the size of soot filter and other variables such as temperature, airflow rates, and loading of the soot filter. The filter material desirably is a material capable of withstanding high temperatures and is functional as a reactive surface for the thermal generation of the soot filter. In one or more embodiments, the filter is a ceramic particulate filter. In one or more embodiments, the filter includes high temperature alumina particles. The filter can also include a material such as cordierite, silicon carbide and silica. The filter further can include a catalyst, e.g., a metal catalyst, to promote the thermal regeneration of the filter.

During thermal regeneration of the soot filter, it is desirable to avoid oxidation or degradation of collected fullerenes. In one or more embodiments, the fullerene collection filter is maintained under inert gas, e.g., nitrogen or argon, and/or at reduced temperatures, so as to avoid oxidation of the fullerene species collected at the filter, or may be by-passed by the gas effluent of the regeneration. An inert gas can be added to the effluent gases downstream of the thermal regeneration to reduce the temperature of the gas stream. In exemplary embodiments, the fullerene collection filter is maintained at a temperature in the range of about 25° C. to about 100° C. under a nitrogen blanket. In one or more embodiments, the thermal regeneration process is conducted off-line so that the effluent gases of the thermal regeneration are diverted and do not contact collected fullerenes. Alternatively, the condensed fullerenes can be collected and removed before regeneration of the soot filter.

Figure 8:
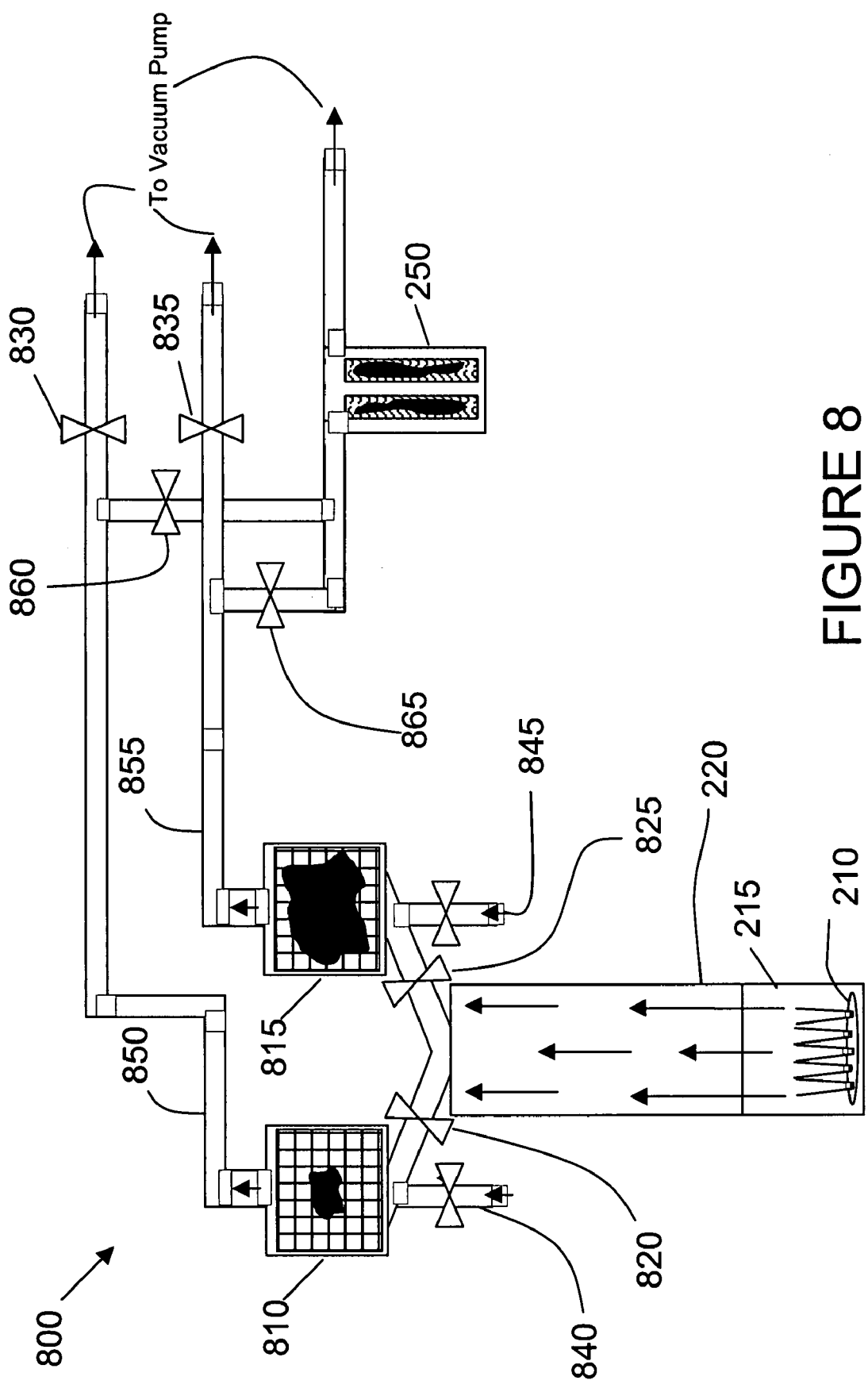
FIG. 8 is a schematic illustration of a fullerene production system that is coupled with a gas/solids separation and purification system according to one or more embodiments of the present invention capable of continuous operation.

FIG. 8 illustrates a system 800 according to one or more embodiments of the present invention for thermal regeneration of soot without interruption to the fullerene formation, separation and collection process. As described above, fullerene formation can be accomplished by combustion synthesis, using a water-cooled burner 210 in a low-pressure combustion chamber 215. The combustion chamber 215 is coupled to a conduit 220 for passage of the combustion gas stream from the combustion chamber to two or more soot filters 810 and 815. Valves 820, 825 can be opened and closed to direct a gas stream from conduit 220 into either soot filter 810 or 815, respectively. Respective valves 830, 835 provide outlet to a vaccum pump for the gas stream flowing through soot filters 810, 815. Soot filters 810, 815 each contain an inlet port 840, 845, respectively, for introducing oxidizing gases used during thermal regeneration, and outlet conduits 850, 855, respectively, for transporting the effluent gases from filters 810, 815, respectively. Conduits 850, 855 are in flow communication with the vacuum pump (through valve 830, 835, respectively) and with fullerene collector 250 (through valves 860, 865, respectively).

In operation, effluent gas generated in combustion chamber 215 is directed through conduit 220 and into one of soot filters 810 or 815 by appropriate positioning of valves 820 and 825. In one mode, gases in conduit 220 are directed through open valve 820 and into soot filter 810 where at least a portion of the effluent gases are separated from suspended soot. The filtered effluent gas exits the soot filter through outlet conduit 850 where fullerenes are condensed and directed into fullerene collector 250. Valve 830 is in the off mode, and valve 860 is in the on mode to ensure that the effluent stream flows through fullerene collector 250.

Either sequentially or simultaneously, oxidizing gases are introduced into soot filter 815 through inlet port 845 to burn out the soot and regenerate the filter. The combustion by-products exit soot filter 815 through outlet conduit 855 and are exhausted to the vacuum pump. Valve 835 is in the on mode, and valve 865 is in the off mode to ensure that the effluent stream flows does not through fullerene collector 250.

The process is reversed when thermal regeneration of filter 810 is desired.

In another embodiment of the present invention, the soot filter is continuously regenerated during the fullerene production, separation and collection process. The combustion conditions are adjusted so that the conditions at the gas/solids separator support soot combustion. A catalyst can be added to the soot filter to catalytically support combustion and to enable soot to be regenerated under conditions that do not condense the condensable gases of the effluent gas or significantly reduce fullerenes yields. Alternatively, oxidizing gases can be introduced at the soot filter to maintain an oxidizing environment during soot separations and regeneration. Referring to FIG. 2, regeneration gases can be introduced at inlet 270. As described in Example 10, continuous regeneration does not result in a reduction of fullerene yield.

The present invention has also discovered that additional fullerenes are liberated or formed during the soot regeneration process. Under oxidizing conditions that consume soot and generate conventional combustion products, e.g., $CO_2$ and water, a significant amount of fullerenes are condensed and collected in the fullerenes collector. The present invention contemplates augmentation of fullerene yield in a post-soot separation process in which soot is oxidized and the resultant oxidation process yield fullerenes. The fullerenes are condensed and collected as is described above. Alternatively, during regeneration, any fullerenes that were condensed during the operation of the gas/solid separator, may be liberated. Further, hot gases, from the combustor or other source, could be applied to the gas/solid separator to sublime fullerenes that were condensed onto the gas/solid separator under conditions where significant amounts of fullerenes were not allowed to pass through the gas/solid separator, e.g., during warm-up, or under other conditions.

Figure 9:
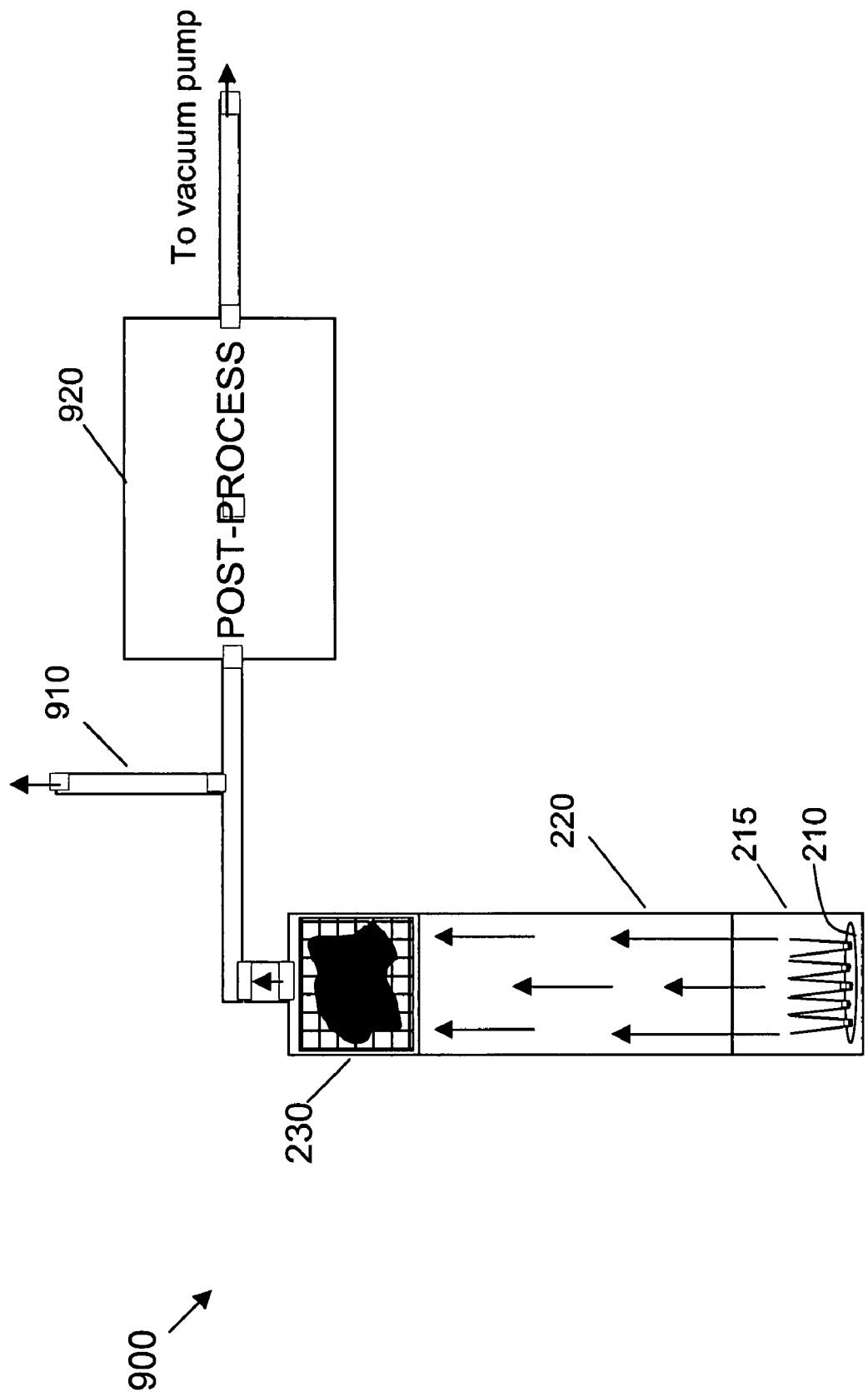
FIG. 9 is a schematic illustration of a fullerene production system that is coupled with a gas/solids separation system according to one or more embodiments of the present invention.

Another aspect of the present invention is illustrated in FIG. 9, in which fullerenes are separated from suspended particles at separator 230 to obtain an effluent gas substantially enriched in fullerenes. The fullerenes can be in the gaseous or condensed suspended solid state.

The fullerene rich gas stream can be used as suspended particles directly in a subsequent in-line process 920. Subsequent processes include modification of the fullerene particles with respect to morphology (e.g., "activation" by addition of steam), size (by temperature control), or other physical and/or chemical attributes. Alternatively, the fullerene-enriched gas stream can be diverted at 910 to other processes that operate on gas-phase fullerenes, such as a vapor deposition process, or nano-particle formation process, or a chemical reaction with the fullerenes, e.g., addition of a chemical functional group to the fullerene molecules in the gas phase.

As noted above, fullerenes from conventional formation and collection processes have been observed embedded in solid soot particles. Various mechanisms can be proposed that are consistent with this observation.

In one scenario, fullerenes can be chemically bonded to soot during the formation process, and can then be layered over with carbon later in the soot formation process. Fullerene-soot chemical bond breaking could occur subsequently in the process of graphitization or other rearrangement of the soot known to occur during the formation and growth of soot particles. Embedded fullerenes that are no longer chemically bound to the soot then could be liberated by opening or break-up of the soot structure by sonication or other means. Such behavior could explain how laser ablation can liberate fullerenes from soot particles that do not yield fullerenes by sonication or extraction, since laser ablation operates at a higher energy that could more effectively break-up the fullerene-soot bonds.

Alternatively, fullerenes could physically absorb onto solid soot particles and become embedded by subsequent addition of carbon to the soot. Solid soot particles naturally agglomerate due to collision and adhesion by Van der Waals forces, and collection of soot by filtration also results in a high degree of agglomeration of the primary, or individual, soot particles. The highly agglomerated soot particles may trap fullerenes through Van der Waals adhesive forces, fullerene adsorption onto soot particles, or reaction during the collection process, e.g., a filtration device agglomerates the solid particles and provides a high surface area for adhesion or reaction. Such agglomeration subsequent to fullerene adsorption onto soot particles could also account for the embedding of fullerenes in soot. Physical adsorption of fullerenes onto soot particles also is consistent with the observed liberation of fullerenes by sonication or laser ablation, since such processes would lead to the break-up of the fullerene agglomerates and release of the adsorbed fullerenes.

In different possible post-formation consumption and/or embedding scenarios, fullerenes (a) are embedded in a process of chemical reaction or adsorption with subsequent carbon growth or solid particle agglomeration during the soot formation process, (b) are adsorbed on primary particles and embedded during the collection of the condensed matter by agglomeration of the solid particles accompanied by condensation or reaction of the fullerenes with the solid particles or (c) are adsorbed onto or react with the solid particle agglomerates at the time of collection.

Based upon these observations, the methods and systems of one or more embodiments of the present invention desirably provides fullerene molecules that are present as gas phase molecules at an accessible location in the chamber or reactor of the process, e.g., at a location relative to the burner in combustion synthesis processes or relative to the arc, the focus of heating, or the center of energy release in carbon vaporization processes where the gas-phase fullerene concentration is at a value which allows production or preferred yields and compositions of fullerenes. Furthermore, fullerene loss due to chemical reaction with or adsorption onto soot is desirably minimized or avoided.

Figure 10:
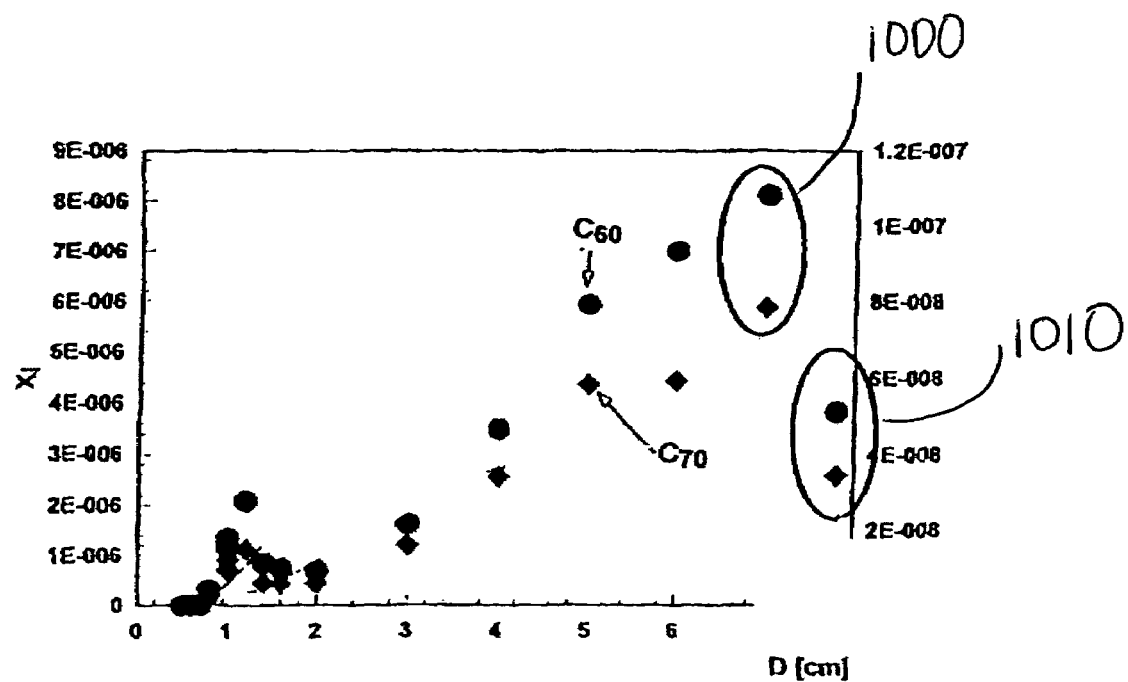
FIG. 10 is a plot of $C_{60}$ and $C_{70}$ concentration profiles for a $\Phi=2.4$ flame (40 torr, $C_6H_6/O_2/Ar(10\%)$), in which the left y-axis is mole fraction of $C_{60}$ and the right y-axis is mole fraction of $C_{70}$, and the x-axis is distance above the burner.

The separations point for the withdrawal of the gaseous effluent from the formation process is chosen so that a significant amount of fullerenes are present as gaseous molecules and consumption by soot is avoided or minimized to a desired degree. An appropriate separations point can be identified by, e.g., measuring the gas-phase fullerene concentration profile with respect to residence time or location in the flame to locate regions of fullerene formation and consumption. Fullerene gaseous concentrations are known for different locations relative to the heat source or formation region. For example, FIG. 10 shows the fullerene concentration profiles for $C_{60}$ and $C_{70}$ for a phi=2.4 flame (40 torr, $C_6H_6/O_2/$Ar(10%) (taken from Richter et al., *Combustion and Flame*, 119:1 (1999)). These fullerene concentration profiles are representative of gaseous fullerenes produced by flame combustion. The circled areas 1000, 1010 correspond to optimal and sub-optimal collection points, respectively, for locating the separations apparatus at a point of maximum fullerene concentration. The separations point can be at a point of high fullerene concentration, minimizing consumption reactions that consume formed fullerenes. The change in concentration from the optimal to sub-optimal distance above a burner can be the result of, for example, consumption reactions reducing the concentration of fullerenes. A sub-optimal (with respect to the fullerene concentration) collection point may also be selected if desired, based on other considerations, such as to remove soot and allow for further fullerene formation in the absence of the formed soot. In certain embodiments, this sub-optimal point may be at a location before any significant fullerene formation, or before any fullerene formation, but at a location that has an amount of fullerene precursors.

The transport process of effluent gas in the separation zone controls to a desired degree any chemical consumption reaction of fullerenes with the solid particles or other species, e.g., by operating the separation on a time-scale shorter than the consumption reactions, by controlling the cooling of the gas effluent, or by adding a diluent. In further embodiments, rapid cooling may be employed so that radical species are quenched before reaction with fullerenes.

Solid particle agglomeration processes that could embed any adsorbed fullerenes are controlled during the gaseous effluent transportation and subsequent separation processes, e.g., by performing the solids separation quickly relative to the aerosol collision frequency, such as by rapid filtration or electrostatic precipitation or electrostatic separation.

The formation of a fullerenes condensed phase in the form of a solid particle or adsorbed species is controlled to a desired degree before separation of the solid particles, e.g. by controlling the temperature of the gaseous effluent so as to control adsorption of fullerenes onto the solid particles, by volatilizing adsorbed fullerenes prior to solid particle separation, or by operating the solid particle separation on a time-scale shorter than the time-scale for formation of a fullerene condensed phase. These objectives may be accomplished by operating the solids separation apparatus, such as an electrostatic precipitator or filter, at a temperature above the condensation point of the fullerenes, which is substantially in the range, depending on the concentration of fullerenes and pressure of the gaseous effluent, of between about 300° C. to about 2000° C.

Fullerene adsorption onto or reaction with solid particles during the solid particle collection process is controlled to a significant degree, e.g., by control of the gas flow and transport of fullerenes to the solid particles, or by control of the temperature of the solid particle collection process. In one or more embodiments, gas/solid separations is accomplished using a method other than filtration that avoids unnecessary contact between the fullerenes and the solid particulate matter. Alternatively, if filtration is used, the filter is preferably operated in the range from about 300° C. to about 2000° C. so that fullerenes are at a temperature that is sufficiently high to ensure that the fullerenes do not condense onto the solid soot particles, but at a temperature that does not lead to substantial reaction of the fullerenes with the solid particles.

A method to separate a fraction of fullerenes in the gaseous effluent or fullerene-rich stream into individual fullerene species is used, e.g., by controlled cooling of the gaseous effluent so that individual fullerenes are selectively condensed or precipitated as solid particles and collected by filtration, electrostatic precipitation or the like. Separation of the fullerene fraction of the soot-filtered gaseous effluent can be accomplished by controlled cooling of the gaseous effluent so that the temperature of the gaseous effluent is between the condensation temperature of the individual fullerene species, for example at about 450° C., which is above the saturation temperature of $C_{60}$ at certain exemplary conditions, but below that of $C_{84}$. The $C_{84}$ and possibly less volatile fullerenes that form as a solid can be condensed onto a surface or precipitated as a solid particle and separated by filtration or electrostatic precipitation. The temperature of the gaseous effluent can then be controlled to less than about 400° C. to precipitate or condense $C_{60}$. The exact temperatures necessary to accomplish this step are a function of the fullerene saturation levels and pressure of the gaseous effluent and may be substantially different than those mentioned here.

Control of the various features of the separations process results in a purified mixed fullerene fraction and/or in purified fractions of individual fullerene species. The separations occur through operations on the gaseous effluent stream in a batch, semi-continuous, or continuous manner in-line with the formation process. The separations system functions by controlling the gas-solid conversion and/or condensation of fullerenes and condensable gaseous impurities and soot aerosol dynamics in the formation gaseous effluent stream to prevent to a desired degree embedding of fullerenes into the solid soot particles and allow preferential collection of fullerenes. One or more embodiments of the present invention provides for the collection of mixed fullerenes and/or individual fullerenes from the formation effluent as substantially un-embedded, i.e., free, components. Therefore, a high-energy separation process such as sonication or the like is not necessary to recover and purify the fullerenes from collected condensed matter. The present method also offers the advantage of recovery of more fullerenes from a given condition by reducing to a desired degree the fraction of fullerenes embedded irreversibly into the solid particles present in the formation process.

The close coupling of the collection and separations apparatus of this invention to the formations process is desired. Should this coupling be performed inadequately, the resulting separations may be reduced in efficiency. thus, it is desired to operate with a formations process providing appreciable amounts of gaseous fullerenes that will maximize collected fullerenes, to collect fullerenes at an optimal collection point to maximize the amount of collected fullerenes, and to control the consumption pathways of fullerenes to avoid or minimize fullerene loss. Also, solid particles left remaining in the gas-phase after soot separation will act as nucleation sites for condensing fullerenes and render necessary a further process such as high energy solvation technique to remove the fullerenes from the solid soot particles. It is contemplated, however, that low levels of soot or other aerosol particles may be desired to act as nucleation sites and to enhance the fullerene condensation process. Other processes include sonic (e.g., ultrasound), ionic (e.g., chemi-ionization by addition of a low ionization potential species), or radioactive (e.g., bipolar ion neutralization).

The various embodiments of the present invention are illustrated in the following examples, which are presented for the purpose of illustration only and which are not limiting of the scope of the invention.

EXAMPLE 1

The separation and collection of fullerenes from soot and PAH is described.

Fullerene formation, separation and collection are accomplished using the system described in FIG. 2. A jet burner was housed in a 10" ID Alumina insulated pipe section. Benzene flow rate was in the range of 10 SLPM to 25 SLPM, phi was in the range of 2.2 to 3.0, and pressure was in the range of 10 to 200 torr. The jet burner provided high flow rates of fuel, giving plenty of heat to maintain temperatures in the post-soot separation zone, and allowed for higher production rates of fullerenes compared to flat-flame systems. The combustion chamber was coupled through a conduit pipe section (6" ID, 6' long) to the separator, which contained a 10.5" diameter, 12" long cordierite 10 µm particulate filter having a surface area of approximately 200 ft$^2$ (Celcor brand from Corning Inc.), (hereinafter, the "soot filter"). The soot filter was designed for use up to ~1200° C. for removal of particulate matter in diesel emissions (commonly referred to as a diesel particulate filter, DPF). The hot gases (300° C.-1000° C.) entering the soot filter contained soot, fullerenes, and other condensable gases and gases non-condensable at the conditions described here. Soot was filtered out continuously for a time typically lasting from 1-4 hours.

The temperature of the gas effluent of the soot filter was monitored and maintained so that desired condensable products are passed through the soot filter. In the present example, temperatures were maintained above 500° C., and generally below 700° C. so that all fullerene species are passed through the soot filter. The soot filter eliminated approximately 95% of the soot present in the entering gas; and higher removal efficiencies are easily obtained by addition of another filtration stage or reduction of the mean pore size of the soot filter, or addition of another one or more separators after the soot filter.

The temperature of the effluent gases exiting the soot filter was between 500° C. and 700° C. The gases then entered a 2" copper pipe section approximately 10 feet in length. Gas temperatures fell to between 100° C. and 300° C. by the time the gases entered the fullerene collection filters. Three stainless steel mesh filters (Dynamesh, from Pall Corp.) with a mean pore size of 10 µm were used as the fullerene collection filters. Purities of the collected fullerenes ranged from 60% to 90% with respect to soot, and were approximately 99% pure with respect to PAH. The low amount of PAH was attributed to the to the residence time (100-500 ms) and temperature (500° C.-1700° C., preferably between 900° C. and 1500° C.) provided in the first conduit between the combustion chamber and the soot filter, which reduced the PAH levels through chemical and physical interactions with other species present in the gases.

No detectable amount of fullerenes or other solid particles (as analyzed gravimetrically and by HPLC) passed through the fullerene collection filter, indicating that the collected particles, which were substantially fullerenes, had a mean particle size well in excess of 10 µm. No significant losses of fullerenes occurred to the pipe walls between the soot filter and the fullerene collection filter, as determined by gas sampling at the beginning and end of the pipe connecting the two filters. The fullerenes collected at the fullerene collection filter were in powder form, could be easily collected from the metal filters, and were much less prone to dust formation upon handling than soot. The collected fullerene powder shows fast dissolution properties, and has no solvent residue, both properties being desirable in many applications.

The separations process was run continuously until the soot filtered became saturated with soot. Complete loading of the soot filtered was determined by a pressure drop across the soot filter. When the soot filter was full, it was reactivated by thermal regeneration. Thermal regeneration was accomplished by flow of air at temperatures of from 100° C.-900° C., preferably 500° C.-800° C., at flow rates of approximately 50 SLPM air. The regeneration cycle lasted from 15 minutes to 1 hour, depending on the temperature, flow rates of air, and loading of the soot filter. During regeneration, $N_2$ was added to the effluent of the soot filter to maintain temperatures at the fullerene collection filter in the range of about 25° C. to 100° C., so that the collected fullerenes were not oxidized by any species, such as $O_2$, present in the gas effluent of the regeneration cycle. This could also be accomplished by by-passing the fullerene collection zone during regeneration.

This process yielded fullerene production rates of 5-20 grams per hour for fullerenes that were substantially free of non-fullerene impurities. Solvent extraction or other post-processing methods were not required to reduce non-fullerene impurities to currently acceptable levels. Eliminating the necessity of collection of the large amount of soot produced as a by-product to the fullerene formation process also greatly reduces cost associated with handling and disposal of this material.

Table 1 reports the yield of total fullerenes (in g/hour) collected from a location just prior to the soot filter (labeled sampling location 275 in FIG. 2). A known amount of combustion gas was collected and the fullerenes were extracted from the total condensable matter by sonication, filtration, and subsequent analysis by HPLC. Total fullerenes for the process of Example 1 were calculated using the weight of fullerenes (as analyzed by HPLC) collected in the fullerene collection filter under conditions where the gas flow rates and time of collection were monitored.

The fullerene yield at sample location 275 (representative of the yield from a conventional combustion process method) was compared to the fullerene yield of the collected condensed fullerenes at the fullerene filter. It can be seen that filtration of soot at temperatures in the range of 500° C. to 700° C. results in collection of a much higher amount of fullerenes. Fullerene yield is about two-fold greater for the sample prepared in Example 1.

TABLE 1

| Collection Method | Production (g/hour) |
| --- | --- |
| Prior to Soot Filtration | 3.3 |
| After Soot Filtration | 6.4 |

EXAMPLE 2

The same system was used as in Example 1, with the same flow-rates of fuel, the same equivalence ratios, pressure, and at the same temperatures of the reactor, coupling zone, and soot filter. Table 2 shows the production rates of fullerenes with and without soot filtration for the fullerenes collected at the fullerene collection filter before thermal regeneration.

TABLE 2

| Collection Method | Production (g/hour) |
| --- | --- |
| Prior to Soot Filtration | 3.3 |
| After Soot Filtration | 4.0 |

The system was then allowed to cool to ambient temperature, and the fullerene filters thoroughly cleaned. The system was then pre-heated with a methane flame to the system temperatures of Example 1, and thermal regeneration was performed by flowing air through the soot filter. After thermal regeneration, the material on the fullerene filters was collected and found to contain substantial amounts of fullerenes. Table 3 shows the augmentation to the production rate for the fuel used for fullerene formation in Table 2.

TABLE 3

| Collection Method | Production (g/hour) |
| --- | --- |
| After Soot Filtration, Without Regeneration | 4.0 |
| With Regeneration | 5.8 |

A substantial augmentation to the fullerene production rate is seen by the procedure outlined in this example.

EXAMPLE 3

The separation and collection of fullerenes from soot and PAH and the purification of fullerenes into different fullerene fractions are described.

Fullerene formation, separation and collection are accomplished using the system described in FIG. 3. Two fullerene collection filters 310, 320 were used to collect different fullerene fractions. The second fullerene collection filter 320 is identical to filter 310. The first fullerene collection filter 310 collected a higher fullerene fraction, in this case a substantial portion of the fullerenes greater in molecular weight than $C_{60}$. The second fullerene collection filter 320 collected a substantial portion of $C_{60}$ and any fullerenes lower in molecular weight than $C_{60}$. Partitioning the total fullerenes produced into two fractions, one $C_{70}$ and higher, and the other primarily $C_{60}$, was accomplished by controlling the temperature of the gas at separator 230 to the range of about 500° C. to 800° C., preferably between 600° C. and 700° C., and allowing for the temperature of the gas at the first filter 310 to drop to approximately 400° to 550° C., preferably 420° C. to 470° C., in a controlled manner, in this case by conductive cooling of the gases through the pipe walls. The temperature of the gas entering the second filter 320 was allowed to drop to approximately 25° C. to 300° C., preferably 80° C. to 150° C. This resulted in a fullerene fraction collected at filter 310 of approximately 96% purity of fullerenes $C_{70}$ and higher with respect to $C_{60}$. Filter 320 collected $C_{60}$ in a purity of approximately 94% with respect to fullerenes $C_{70}$ and higher. Both fullerene fractions are substantially free of soot.

EXAMPLE 4

The same process as described in Example 1 was used. Soot was filtered from the gases as described in Example 1, and temperature of the soot filter was controlled so that fullerenes lower in volatility than $C_{60}$ at the conditions of this example were not allowed to substantially pass through the soot filter, while $C_{60}$ and fullerene and condensable gases higher in volatility than $C_{60}$ pass through the soot filter. Purities of $C_{60}$ of about 95% with respect to $C_{70}$ and less volatile fullerenes ($C_{76}$, $C_{78}$, $C_{84}$, . . . ) was obtained. Temperatures of the effluent gas at the exit of the soot filter were about 400° C. to about 450° C.

EXAMPLE 5

The same process as described in Example 1 was used, however with addition of a 360° bend with a radius of about 1' to the pipe connecting the soot filter to the fullerene filter. The apparatus is shown schematically in FIG. 5. 66% of the fullerenes were collected in the bend, confirming the presence of particles of about 10 μm in size or larger, based on the particle Stokes number and conditions of the gas stream, and physical conditions of the conduit and the bend. This example demonstrates the effectiveness of cyclone separations for the collection of fullerenes. Multiple cyclones could be used for different fullerene fractions if multiple fullerene separations are desired.

EXAMPLE 6

The same process as described in Examples 1 or 2 was used, however the fullerene formation process was replaced with a jet-stirred reactor configuration consisting of offset opposed jets, as described in International Published Application No. WO 03/021018.

EXAMPLE 7

The same process is used as in Example 1, however the soot filter is replaced by a filter with a mean effective pore size of 50 µm. This allows for a certain percentage of the soot present in the gases entering the soot filter to pass through, resulting in a concentrating effect, whereby the fullerene to soot ratio is increased. This product may be desirable in cases where a carbon black product with a percentage of fullerenes provides enhanced performance. Other separation processes, such as cyclone separations, could be used to concentrate the fullerene/soot product.

EXAMPLE 8

The same process is used as in Example 1, however the soot filter is replaced with an electrostatic precipitator, which separates the soot at temperature in the range of about 300° C. to about 1200° C. The soot is collected continuously.

EXAMPLE 9

The same process as Example 8 is used, however, the electrostatic precipitation takes place at temperatures in the range of about 900° C. to about 2000° C., to substantially remove the soot from the entering gases. A region is provided during and downstream of the electrostatic separations so that fullerene formation is promoted, in the range of temperature of about 900° C. to about 2000° C.

EXAMPLE 10

This examples demonstrates the continuous regeneration of the soot filter during formation, separation and collection of fullerenes.

The same system was used as in Example 1, with half the flow rate of fuel, similar equivalence ratios, pressure, and at similar temperatures of the reactor, coupling zone, and soot filter. In this example, regeneration air is introduced just upstream of the soot filter in flow rates similar to those used for non-continuous regeneration described in Example 2, so that oxidation of the soot and regeneration of the soot filter occur while fullerenes are being produced and passed through the soot filter. Table 4 shows the production rates with no continuous regeneration and with continuous regeneration. It can be seen that addition of air to accomplish continuous regeneration does not result in significant losses of fullerenes passed through the soot filter.

TABLE 4

| Collection Method | Production (g/hour) |
| --- | --- |
| After Soot Filter—No Continuous Regeneration | 2.9 |
| After Soot Filtration w/Continuous Regeneration | 2.5 |

Although various embodiments that incorporate the teachings of the present invention have been shown and described in detail herein, those skilled in the art can readily devise many other varied embodiments that incorporate these teachings, including embodiments with numerical values and ranges differing from those set forth herein. It is appreciated that the figures and discussion herein illustrate only an exemplary device and method. Thus, the present invention is not limited to only those structures and methods described herein. The process described above is not restricted to any particular order. The features of various embodiments may be combined with each other. Also, other processes not mentioned above may be included that are consistent with the stated objectives of the invention. In particular it is contemplated that multiple soot filters, e.g., two, three or four or more, may be used to allow and promote fullerene formation with the amounts of soot in the gas stream reduced from typical conditions, and to reduce consumption of fullerenes by soot. The use of multiple fullerene collection filters, e.g., two, three, or four or more, is also contemplated.

What is claimed is:

1. A method of processing fullerenes comprising:
generating a first gas stream comprising suspended soot particles, PAH, and condensable gases, said condensable gases comprising gaseous fullerenes,
reducing PAH content in said first gas stream,
separating, utilizing a filter, at least a portion of the suspended soot particles from the first gas stream to obtain a second gas stream which comprises gaseous fullerenes and is reduced in soot content, and then
condensing at least a portion of the gaseous fullerenes in the second gas stream to collect condensed fullerenes,
wherein at least a portion of said gaseous fullerenes are not condensed prior to said separating.

2. The method of claim 1, wherein the first gas stream is obtained using combustion.

3. The method of claim 1, wherein gaseous fullerenes having a volatility lower than a selected volatility are separated with the suspended soot particles during said separating.

4. The method of claim 1, wherein said reducing PAH content comprises providing the first gas stream with a residence time of between about 10 msec and about 10 sec prior to said separating.

5. The method of claim 1, wherein said reducing PAH content comprises providing the first gas stream with a residence time of between about 100 msec and about 2 sec prior to said separating.

6. The method of claim 1, wherein the condensable gases in said second gas stream is enhanced in selected fullerene species to a greater extent than other fullerene species.

7. The method of claim 1, wherein said separating comprises producing a first fraction and a second fraction of the second gas stream, and the concentration of the suspended soot particles in the first fraction is higher than the concentration of the suspended soot particles in the second fraction.

8. The method of claim 1, wherein said separating is accomplished at a temperature of less than about 1100° C.

9. The method of claim 1, wherein said separating is accomplished at a temperature in the range of about 300° C. to about 2000° C.

10. The method of claim 1, wherein said separating is accomplished at a temperature in the range of about 300° C. to about 900° C.

11. The method of claim 1, wherein said condensing comprises nucleation and/or growth of particles promoted by sonic, ionic, or radioactive methods.

12. The method of claim 1, wherein a diluent gas is added to the first gas stream and/or the second gas stream.

13. The method of claim 1, wherein the temperature of the second gas stream is in the range of about minus 250° C. to 1200° C.

14. The method of claim 1, wherein the temperature of second gas stream is in the range of about 100° C. to 800° C.

15. The method of claim 1, wherein the percentage by weight of fullerenes to soot and other condensables in the condensed fullerenes is in the range of about 70% to 100%.

16. The method of claim 1, wherein the condensed fullerenes comprise about 10% to about 70% by weight fullerenes.

17. The method of claim 1, wherein temperature of the first gas stream and/or the second gas stream is controlled by conductively cooled surfaces, inert gases, heat absorption by phase change, or combinations thereof.

18. The method of claim 1, wherein the condensed fullerenes form as suspended fullerene particles.

19. The method of claim 18, wherein the condensed fullerenes condense by heterogeneous nucleation and/or homogeneous nucleation.

20. The method of claim 19, wherein seed particles for said heterogeneous nucleation comprise soot.

21. The method of claim 18, wherein the mean size of the suspended fullerenes particles is in the range of 0.1 µm to 500 µm.

22. The method of claim 18, wherein the mean size of the suspended fullerenes particles is in the range of 10 µm to 200 µm.

23. The method of claim 1, further comprising:
collecting the condensed fullerenes.

24. The method of claim 23, wherein said collecting comprises separating the condensed fullerenes from the second gas stream.

25. The method of claim 24, wherein said separating the condensed fullerenes from the second gas stream are carried out using a process independently selected from the group consisting of filtration, electrostatic precipitation, electrostatic separation, inertial separation, and combinations thereof.

26. The method of claim 25, wherein said separating the condensed fullerenes from the second gas stream are carried out using a process independently selected from the group consisting of sieve filtration, fiber filtration, packed bed filtration, and combinations thereof.

27. The method of claim 23, wherein said collecting comprises condensing the gaseous fullerenes and/or the condensed fullerenes onto a surface.

28. The method of claim 23, wherein the velocity of the second gas stream is maintained at a velocity selected to minimize losses of fullerenes to surfaces during conveyance of the second gas stream to a collection site.

29. The method of claim 23, further comprising condensing and collecting non-fullerene condensable species subsequent to said collecting the condensed fullerenes.

30. The method of claim 29 wherein the non-fullerene condensable species comprises polycyclic aromatic hydrocarbons.

31. The method of claim 23, wherein the collected condensed fullerenes are enriched in fullerenes as compared to the fullerene content of the first gas stream.

32. The method of claim 1, wherein said condensing comprises condensing a first selected fullerene species or a first set of selected fullerene species.

33. The method of claim 32, further comprising:
collecting the condensed first selected fullerene species or the condensed first set of selected fullerene species.

34. The method of claim 33, wherein said collecting the condensed first selected fullerene species or the condensed first set of selected fullerene species comprises a gas/solid separations process.

35. The method of claim 34, further comprising:
condensing a second selected fullerene species or a second set of selected fullerene species after said condensing the first selected fullerene species or the first set of selected fullerene species.

36. The method of claim 35, further comprising:
collecting the condensed second selected fullerene species or the condensed second set of selected fullerene species.

37. The method of claim 36, wherein said collecting the condensed second selected fullerene species or the condensed second set of fullerene species comprises a second gas/solid separations process.

38. The method of claim 1, further comprising:
maintaining conditions in a reaction zone subsequent to said separating to promote additional fullerene formation in the second gas stream.

39. The method of claim 38, wherein additional suspended soot particles are formed in the second gas stream as a by-product of the additional fullerene formation, said method further comprising separating at least a portion of the additional suspended soot particles from the second gas stream.

40. The method of claim 39, further comprising:
condensing at least a portion of the fullerenes from the condensable gases after said separating at least a portion of the additional suspended soot particles from the second gas stream; and
collecting the condensed fullerenes.

41. The method of claim 38, wherein temperatures in said reaction zone are maintained at about 500° C. to 2200° C.

42. The method of claim 38, wherein temperatures in said reaction zone are maintained at about 900° C. to 1700° C.

43. The method of claim 1 or 23, wherein said separating is operated in a steady mode.

44. The method of claim 1 or 23, wherein said separating is operated in an un-steady mode.

45. The method claim 1 or 23, wherein residence time of said separating is controlled by addition of an inert gas.

46. A method for processing fullerenes comprising:
burning a carbon-containing fuel in a combustion chamber under conditions effective to produce fullerenes and to generate a first gas stream comprising suspended soot particles, PAH, and condensable gases, said condensable gases comprising gaseous fullerenes;
reducing PAH content in said first gas stream;
separating, utilizing a filter located between the combustion chamber and a collection zone, at least a portion of the suspended soot particles from the first gas stream to obtain a second gas stream which comprises gaseous fullerenes and is reduced in soot content;
condensing at least a portion of the gaseous fullerenes in the second gas stream; and
collecting the condensed fullerenes at the collection zone.

47. The method of claim 46, wherein said separating is accomplished at a temperature less than about 1100° C.

48. The method of claim 46, wherein said separating is accomplished at a temperature in the range of about 300° C. to about 900° C.

49. The method of claim 46, wherein said reducing PAH content comprises providing the first gas stream with a residence time of between about 10 msec and about 10 sec prior to said separating.

50. The method of claim 46, wherein said reducing PAH content comprises providing the first gas stream with a residence time of between about 100 msec and about 2 sec prior to said separating.

51. The method of claim 46, wherein said separating comprises producing a first fraction and a second fraction of the second gas stream, and the concentration of the suspended soot particles in the first fraction is higher than the concentration of the suspended soot particles in the second fraction.

52. The method of claim 46, wherein said separating is carried out using a process selected from the group consisting of sieve filtration, fiber filtration, packed bed filtration, and combinations thereof.

53. The method of claim 46, wherein said separating is conducted at a time and location selected to separate suspended soot particles that have an average particle size in the range of 0.1 µm-100 µm.

54. The method of claim 46, wherein said separating is conducted at a time and location selected to separate suspended soot particles that are collectable on a filter having a mean effective pore size in the range of about 0.1-100 µm.

55. The method of claim 46, wherein the percentage by weight of fullerenes to soot and other condensables in the collected condensed fullerenes is in the range of about 70% to 100%.

56. The method of claim 46, wherein the collected condensed fullerenes is enriched in fullerenes as compared to the fullerene content of the first gas stream.

57. The method of claim 46, wherein the collected condensed fullerenes comprise about 10% to about 70% by weight fullerenes.

58. The method of claim 46, wherein temperature of the first gas stream and/or second gas stream is controlled by conductively cooled surfaces, and/or inert gases, and/or heat absorption by phase change.

59. The method claim 46, wherein residence time of said first gas stream is altered by addition of an inert gas.

60. The method of claim 46, wherein the collected condensed fullerenes are substantially free of polycyclic aromatic hydrocarbons (PAH).

61. The method of claim 46, wherein the collected condensed fullerenes are substantially free of soot.

62. The method of claim 46, wherein said separating is accomplished utilizing a ceramic particulate filter.

63. The method of claim 62, wherein the ceramic particulate filter contains a catalyst to promote thermal regeneration of the filter to remove collected soot.

64. The method of claim 63, wherein the ceramic particulate filter is selected from the group consisting of cordierite, silicon carbide, alumina, alumina/silica compositions, and combinations thereof.

65. The method of claim 63, wherein the catalyst is a metal.

66. The method of claim 46, wherein the condensed fullerenes condense as suspended fullerene particles.

67. The method of claim 66, wherein the condensed fullerenes condense by heterogeneous nucleation and/or homogeneous nucleation.

68. The method of claim 67, wherein seed particles for heterogeneous nucleation comprise soot.

69. The method of claim 66, wherein the mean size of the suspended fullerene particles is in the range of 0.1 µm to 500 µm.

70. The method of claim 66, wherein the mean size of the suspended fullerene particles is in the range of 10 µm to 200 µm.

71. The method of claim 46, wherein said collecting the condensed fullerenes comprises separating the condensed fullerenes from the second gas stream.

72. The method of claim 71, wherein said separating the condensed fullerenes from the second gas stream is carried out using a process selected from the group consisting of filtration, electrostatic precipitation, inertial separation, electrostatic separation, and combinations thereof.

73. The method of claim 72, wherein said separating the condensed fullerenes from the second gas stream is carried out using a process selected from the group consisting of sieve filtration, fiber filtration, packed bed filtration, and combinations thereof.

74. The method of claim 46, wherein the second gas stream comprises nucleation sites to promote the condensation of the gaseous fullerenes.

75. The method of claim 74, wherein the nucleation sites comprise soot particles, or other suspended particles having a particle size in the range of about 0.01 µm 100 µm.

76. The method of claim 46, frirther comprising:
condensing at least a portion of a non-fullerene species in the condensable gases after said separating; and
collecting the condensed non-fullerene species.

77. The method of claim 76, wherein said condensing at least a portion of a non-fullerene species is carried out at a temperature in the range of about negative 250° to about 600° C.

78. The method of claim 1 or 46, further comprising:
during or after said separating, introducing an oxidative species at temperatures that allow for oxidation of the separated soot.

79. A method for processing fullerenes, comprising:
burning a carbon-containing fuel in a flame in a combustion chamber under conditions effective to produce fullerenes and to generate a first gas stream comprising suspended soot particles, PAH, and condensable gases, said condensable gases comprising gaseous fullerenes;
separating, utilizing a filter located between the combustion chamber and a collection zone, at least a portion of the suspended soot particles from the first gas stream to obtain a second gas stream, wherein the second gas stream comprises gaseous fullerenes and is reduced in soot content;
condensing at least a portion of the gaseous fullerenes in the second gas stream at a temperature between about 100° C. to about 800° C. to allow at least a portion of PAH in the second gas stream to remain as gaseous PAH in the second gas stream;
collecting the condensed fullerenes at the collection zone.

80. The method of claim 79, wherein said condensing condenses at least a portion of the gaseous fullerenes in the second gas stream as suspended fullerene particles in the second gas stream, and the suspended fullerene particles are introduced into the subsequent location.

81. The method of claim 79, further comprising condensing and collecting PAH subsequent to said collecting the condensed fullerenes.

82. The method of claim 79, wherein said condensing at least a portion of the fullerenes in the second gas stream is carried out at a temperature between about 100° C. to about 550° C.

83. The method of claim 79, further comprising reducing PAH content in said first gas stream prior to said separating.

84. A method of processing fullerenes comprising:
generating a first gas stream comprising suspended soot particles, PAH, and condensable gases, said condensable gases comprising gaseous fullerenes,
reducing PAH content in said first gas stream,
separating, utilizing a filter, at least a portion of the suspended soot particles from the first gas stream to obtain a second gas stream comprising said gaseous fullerene;
condensing at least a portion of the fullerenes in the second gas stream at a temperature between about 100° C. to about 800° C. to allow at least a portion of any non-fullerene species in the second gas stream to remain as gaseous non-fullerene species in the second gas stream; and collecting the condensed fullerenes.

85. The method of claim 84, further comprising:

heating the collected fullerenes to sublime at least a fullerene species; and condensing the sublimed fullerene species.

86. A method of processing fullerenes comprising:

generating a first gas stream comprising suspended soot particles, PAH, and condensable gases, said condensable gases comprising gaseous fullerenes, reducing PAH content in said first gas stream, separating, utilizing a filter, at least a portion of the suspended soot particles from the first gas stream to obtain a second gas stream, wherein the second gas stream comprises gaseous fullerenes and is reduced in soot content;

condensing, after said separating, at least a portion of the gaseous fullerenes in the second gas stream; and collecting the condensed fullerenes.

87. The method of claim 1, 46, 79, 84, or 86, wherein said condensing is carried out at a temperature in the range of about 100° C. to about 800° C.

* * * * *